US011797004B2

(12) United States Patent
Giuliano et al.

(10) Patent No.: US 11,797,004 B2
(45) Date of Patent: Oct. 24, 2023

(54) CAUSING A ROBOT TO EXECUTE A MISSION USING A TASK GRAPH AND A TASK LIBRARY

(71) Applicant: Aurora Flight Sciences Corporation, a subsidiary of The Boeing Company, Manassas, VA (US)

(72) Inventors: Alfredo Giuliano, Lucerne (CH); Jeffery Saunders, Quincy, MA (US)

(73) Assignee: Aurora Flight Sciences Corporation, A Subsidiary Of The Boeing Company, Manassas, VA (US)

( * ) Notice: Subject to any disclaimer, the term of this patent is extended or adjusted under 35 U.S.C. 154(b) by 249 days.

(21) Appl. No.: 17/148,141

(22) Filed: Jan. 13, 2021

(65) Prior Publication Data

US 2022/0035372 A1 Feb. 3, 2022

Related U.S. Application Data

(60) Provisional application No. 63/059,394, filed on Jul. 31, 2020.

(51) Int. Cl.
*G05D 1/00* (2006.01)
(52) U.S. Cl.
CPC ......... *G05D 1/0088* (2013.01); *G05D 1/0027* (2013.01); *G05B 2219/32129* (2013.01); *G05B 2219/50391* (2013.01)
(58) Field of Classification Search
CPC .............. G05D 1/0088; G05D 1/0027; G05B 2219/32129; G05B 2219/5039
See application file for complete search history.

(56) References Cited

U.S. PATENT DOCUMENTS 9,557,742 B2 1/2017 Paduano
10,453,351 B2 10/2019 Choi et al.
2004/0024490 A1 2/2004 McLurkin et al.
(Continued)

FOREIGN PATENT DOCUMENTS

WO 2019079286 A1 4/2019

OTHER PUBLICATIONS

Ogren, P. "Increasing Modularity of UAV Control Systms using Computer Game Behavior Trees", American Institute of Aeornautics and Astronautics, Sep. 2012, pp. 1-8.
(Continued)

*Primary Examiner* — Ramsey Refai
(74) *Attorney, Agent, or Firm* — Quinn IP Law

(57) ABSTRACT

A method and corresponding apparatus and computer-readable storage medium are provided for causing one or more robots to execute a mission. The method includes identifying the mission including a nominal sequence of selected tasks that are executable to cause the one or more robots to execute maneuvers to achieve a mission objective. The method includes determining a task graph in which the mission is modeled. The task graph is expressed as a directed graph and includes selected task nodes representing the selected tasks that are connected by edges representing transitions between the selected tasks. The method also includes causing the one or more robots to execute the mission using the task graph and a task library of tasks including a selected task executable to cause the one or more robots to execute a maneuver.

21 Claims, 21 Drawing Sheets

(56) References Cited

U.S. PATENT DOCUMENTS

| | | | |
|---|---|---|---|
| 2009/0265299 A1* | 10/2009 | Hadad | G06N 5/02 |
| | | | 706/55 |
| 2014/0074339 A1* | 3/2014 | Casado | G05D 1/00 |
| | | | 701/24 |
| 2017/0019479 A1 | 1/2017 | Rangarajan et al. | |
| 2018/0100743 A1* | 4/2018 | Diaz | G01C 21/3446 |
| 2019/0095725 A1 | 3/2019 | Kalghatgi et al. | |
| 2019/0324456 A1* | 10/2019 | Ryan | B64C 13/18 |
| 2020/0118446 A1 | 4/2020 | Saunders | |
| 2021/0405660 A1* | 12/2021 | Liu | F41H 13/00 |

OTHER PUBLICATIONS

"Behavior tree (artificial intelligence, robotics and control)", Wikipedia, Dec. 2020, retrieved from https://en.wikipedia.org/w/index.php?title=Behavior_tree_(artificial_intelligence,_robotics_and_control)&oldid=994954127.

Davies, J. et al., "Comparative Analysis of ACAS-Xu and DAIDALUS Detect-and-Avoid Systems", NASA, Feb. 2018, pp. 1-36.

Munoz, C. et al., "DAIDALUS: Detect and Avoid Alerting Logic for Unmanned Systems", NASA. Sep. 2015, pp. 1-12.

European Search Report dated Dec. 10, 2021 in European Application No. 21187633.9.

Shaurya et al., "Incorporating Potential Cotingency Tasks in Multi-Robot Mission Planning", 2018 IEEE International conference on Robotics and Automation (ICRA), IEEE, May 2018, pp. 1-7.

Shaurya et al., "Incorporation of Contingency Tasks in Task Allocation for Multirobot Teams", IEEE Transactions on Automation Science and Engineering, Nov. 2019, pp. 809-822.

Hongfei et al., "UUV Autonomous Decision-Making Method Based on Dynamic Influence Diagram", Complexity, vol. 2020, Jun. 2020, pp. 1-4.

Ahmad et al., "Communication-Computation co-Design of Decentralized Task chain in CPS Applications", 2019 Design, Automation test in Europe Conference Exhibition, EDAA, Mar. 2019, pp. 1082-1087.

Usach, Hector et al., "Architectural design of a Safe Mission Manager for Unmanned Aircraft Systems", Journal of Systems Architecture, Elsevier BV, NL, vol. 90, Sep. 2018, pp. 94-108.

* cited by examiner

CAUSING A ROBOT TO EXECUTE A MISSION USING A TASK GRAPH AND A TASK LIBRARY

CROSS-REFERENCE TO RELATED APPLICATION(S)

This application claims priority to U.S. Provisional Application No. 63/059,394, filed Jul. 31, 2020, entitled Causing a Robot to Execute a Mission Using a Task Graph and a Task Library, the content of which is incorporated herein by reference in its entirety.

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems. Furthermore, it is generally desirable to improve existing systems to enhance their efficiency and operation.

Therefore it would be desirable to have a system and method that takes into account at least some of the issues discussed above, as well as other possible issues.

BRIEF SUMMARY

A mission is a deployment of a robot (one or more robots) to achieve one or more mission objectives. A mission may be decomposed into behaviors or actions involving the robot maneuvering with optional sensor and/or effector scheduling; and a mission may be enhanced by contemplating contingency events whose resolution makes use of other behaviors. In various examples, a maneuver may be defined as a path through space, a path and velocity through space, rate or acceleration commands, direct actuator and propulsion commands, or the like. Contingency events may include a strong tail wind, actuator failure, propulsion degraded mode, propulsion failure, computer redundancy failure, navigation degraded mode (e.g., GPS loss), navigation failure, communication loss, sensor degraded mode, sensor failure, or the like.

According to example implementations, a robot may be managed to execute tasks to implement these behaviors with specific parameters and capabilities, and these tasks may be modeled in a task graph of nodes interconnected through transition logic. The task graph may decouple the semantic of a specific mission from its general structure; and therefore, decouple mission planning from mission execution. This may in turn separate non-predictive decision making from predictive mission making. A mission planning and mission execution may together realize autonomic behavior.

In some examples, the robot and/or its environment may be monitored for events such as contingency events. When an event is detected, the event may be mapped to a level of contingency, and the event may be resolved according to the level of contingency.

In some examples in which a mission is modeled in a task graph, feasibility of a path in the task graph may be determined before the mission is executed, as well as during execution of the mission. In particular, a predicted performance of the robot for the path may be determined, and the feasibility of the path may be determined from the predicted performance of the robot. A mission on a feasible path may continue uninterrupted, while a mission that is on an infeasible path may cause any of a number of different responses. An infeasible path may be replanned, its determination may be treated as a contingency event to be resolved, or it may prompt an operator to intervene.

The present disclosure thus includes, without limitation, the following example implementations.

Some example implementations provide a method of causing one or more robots to execute a mission, the method comprising identifying the mission including a nominal sequence of selected tasks that are executable to cause the one or more robots to execute maneuvers to achieve a mission objective; determining a task graph in which the mission is modeled, the task graph expressed as a directed graph and including selected task nodes representing the selected tasks that are connected by edges representing transitions between the selected tasks; and causing the one or more robots to execute the mission using the task graph and a task library of tasks including a selected task executable to cause the one or more robots to execute a maneuver.

In some example implementations of the method of any preceding example implementation, or any combination of any preceding example implementations, the selected task in the nominal sequence of the selected tasks causes the one or more robots to execute a nominal maneuver, or an alternate maneuver when a task-specific contingency event occurs during execution of the nominal maneuver, and wherein causing the one or more robots to execute the mission includes causing the one or more robots to execute the mission using the task library that includes the selected task executable to cause the one or more robots to execute the nominal maneuver, or the alternate maneuver when the task-specific contingency event occurs.

In some example implementations of the method of any preceding example implementation, or any combination of any preceding example implementations, the mission further includes one or more alternate tasks to be executed when a contingency event occurs during execution of the selected task in the nominal sequence of selected tasks, and wherein determining the task graph includes determining the task graph further including one or more alternate task nodes representing the one or more alternate tasks.

In some example implementations of the method of any preceding example implementation, or any combination of any preceding example implementations, the mission is associated with one or more alternate tasks to be executed when a contingency event occurs during execution of any one of the selected tasks in the nominal sequence of selected tasks, and wherein determining the task graph includes determining an alternate task graph including one or more alternate task nodes representing the one or more alternate tasks, each selected task node associated with the alternate task graph.

In some example implementations of the method of any preceding example implementation, or any combination of any preceding example implementations, causing the one or more robots to execute the mission includes for a robot of the one or more robots accessing mission data including the task graph in which the mission is modeled; traversing the task graph including the selected task nodes; and when a selected task node representing the selected task is visited, calling on the task library to execute the selected task and thereby cause the robot to execute the maneuver.

In some example implementations of the method of any preceding example implementation, or any combination of any preceding example implementations, the mission further includes an alternate task to be executed when a contingency event occurs during execution of the selected task, the task graph further includes an alternate task node representing the alternate task, and the tasks in the task library further include the alternate task, and wherein the method further comprises for the robot of the one or more robots detecting occurrence of the contingency event during execution of the selected task; transitioning in the task graph from the selected task node to the alternate task node; and calling on the task library to execute the alternate task and thereby cause the robot to execute another maneuver.

In some example implementations of the method of any preceding example implementation, or any combination of any preceding example implementations, the mission is associated with one or more alternate tasks to be executed when a contingency event occurs during execution any one of the selected tasks, the task graph is associated with an alternate task graph including one or more alternate task nodes representing the one or more alternate tasks, and the tasks in the task library further include the one or more alternate tasks, and wherein the method further comprises for the robot of the one or more robots detecting occurrence of the contingency event during execution of any one of the selected tasks; transitioning to the alternate task graph; and calling on the task library to execute the one or more alternate tasks and thereby cause the robot to execute one or more other maneuvers.

Some example implementations provide an apparatus for causing one or more robots to execute a mission, the apparatus comprising a memory having computer-readable program code stored therein; and processing circuitry configured to access the memory, and execute the computer-readable program code to cause the apparatus to at least perform the method of any preceding example implementation, or any combination of any preceding example implementations.

Some example implementations provide a computer-readable storage medium for causing one or more robots to execute a mission, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
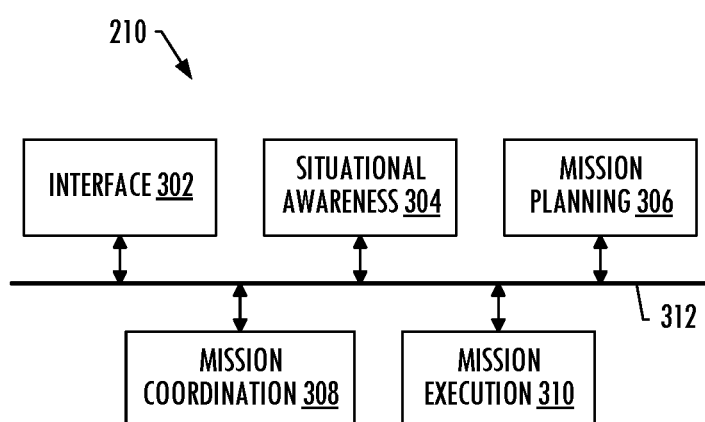
Figure 4:
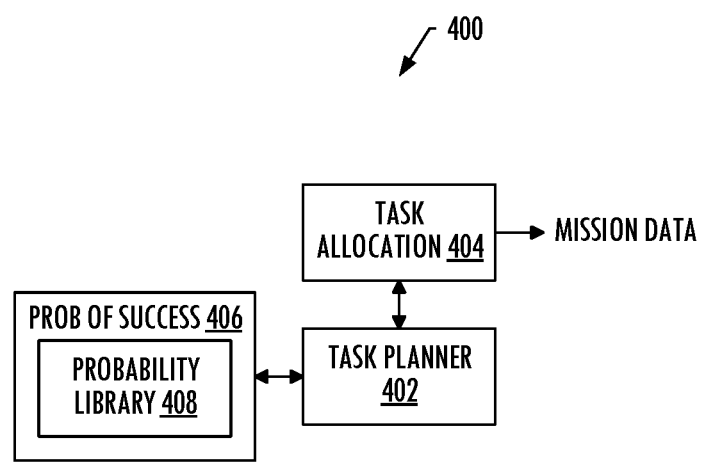
Figure 6:
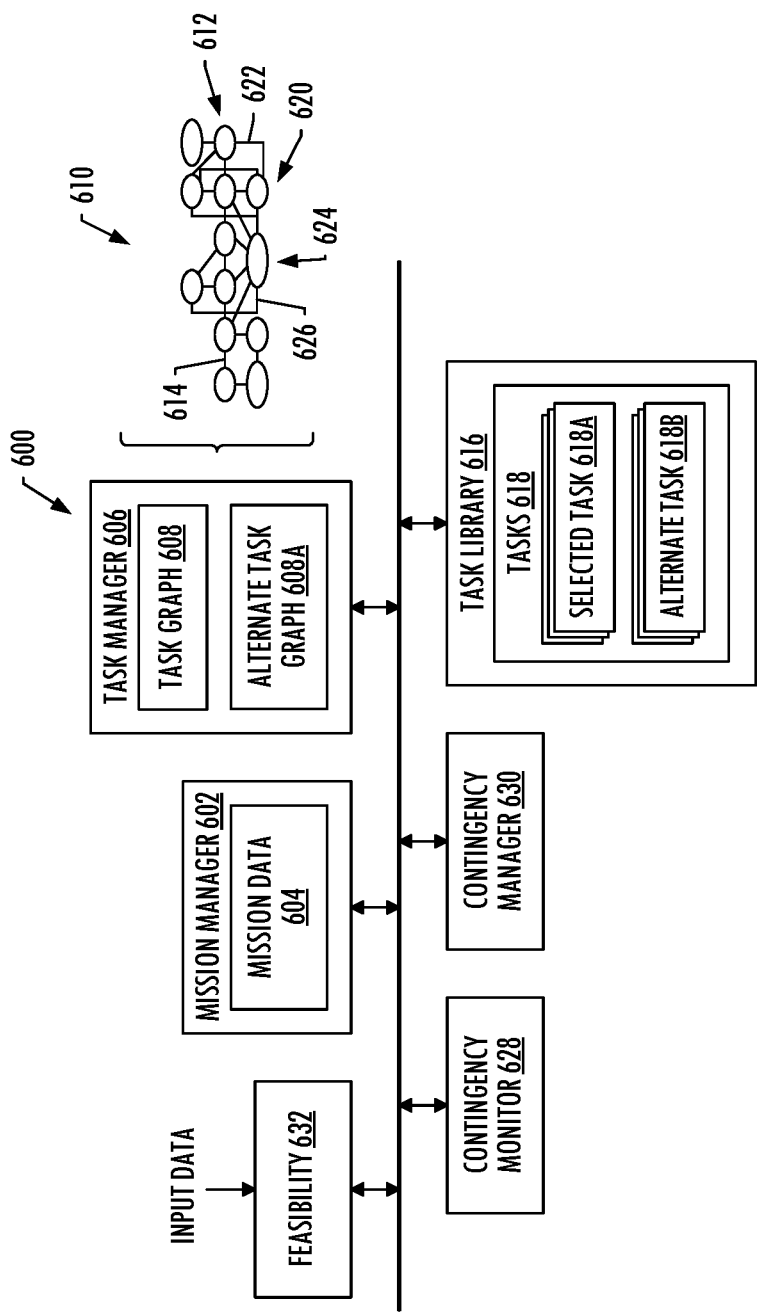
Figure 7:
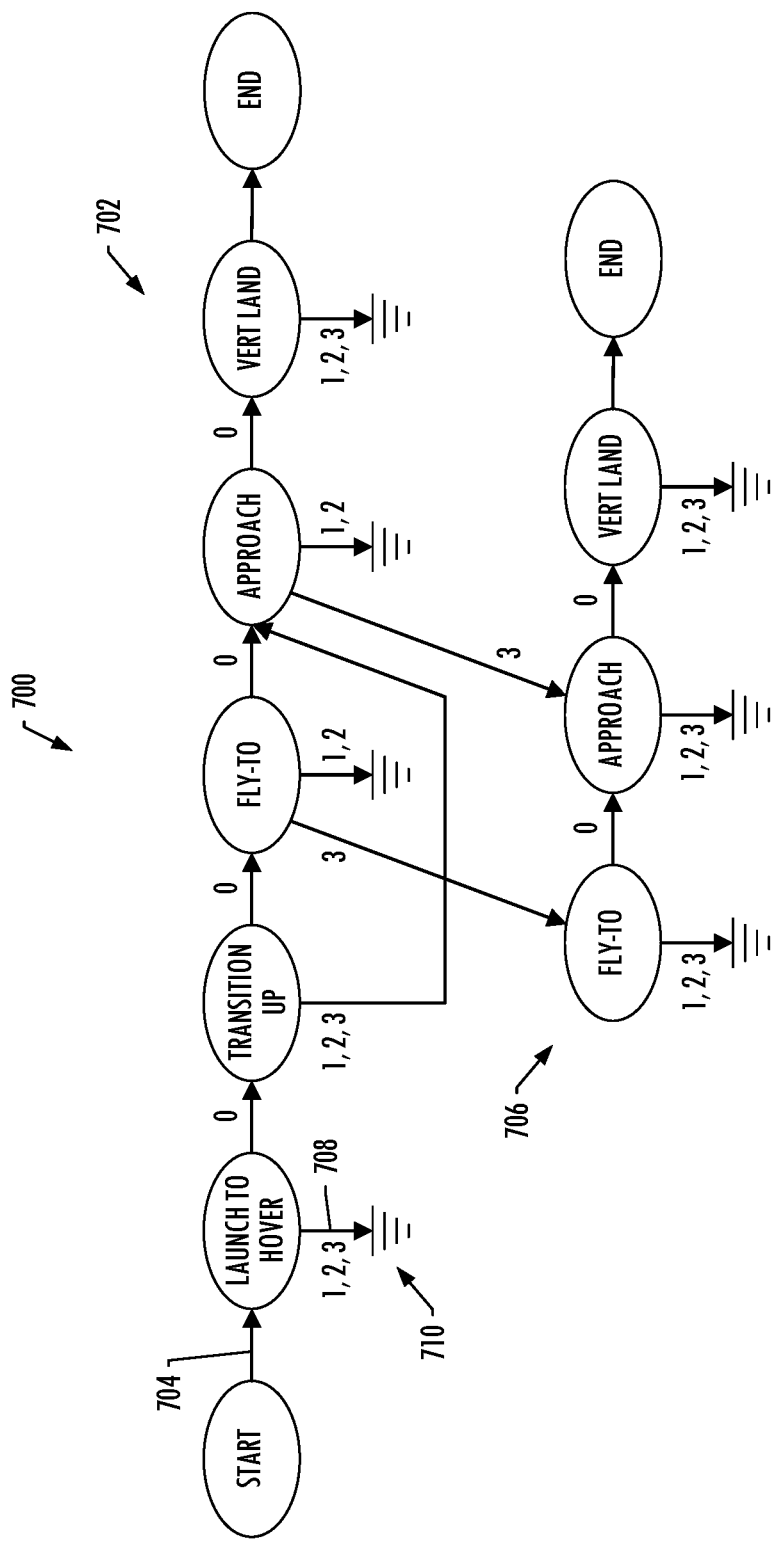
Figure 8:
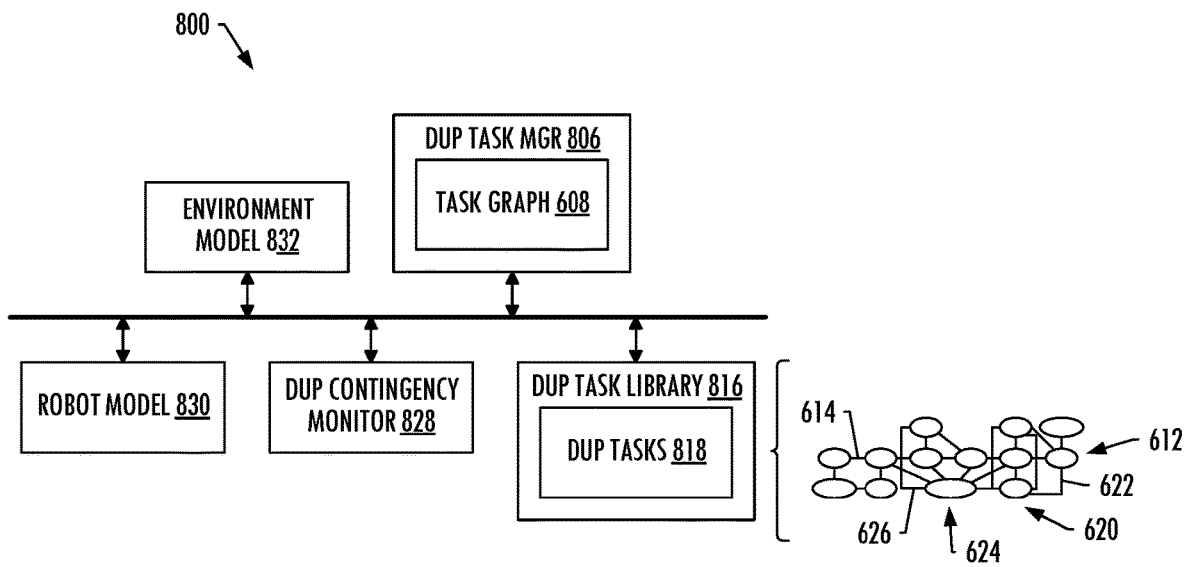
Figure 9:
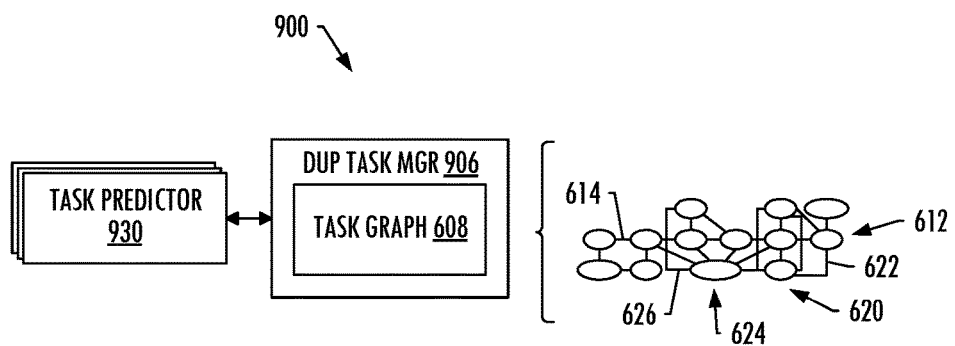
Figure 10A:
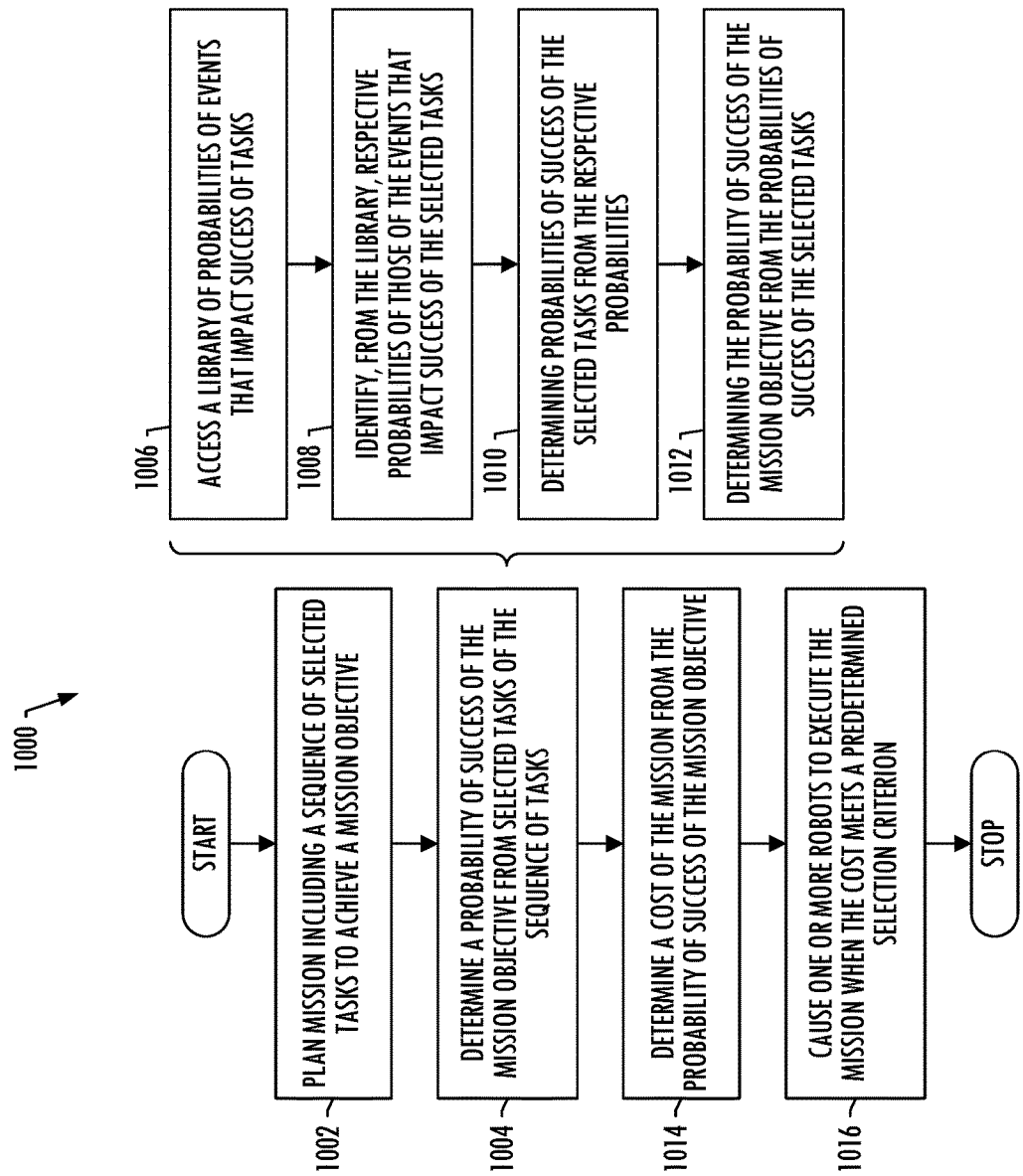
Figure 10B:
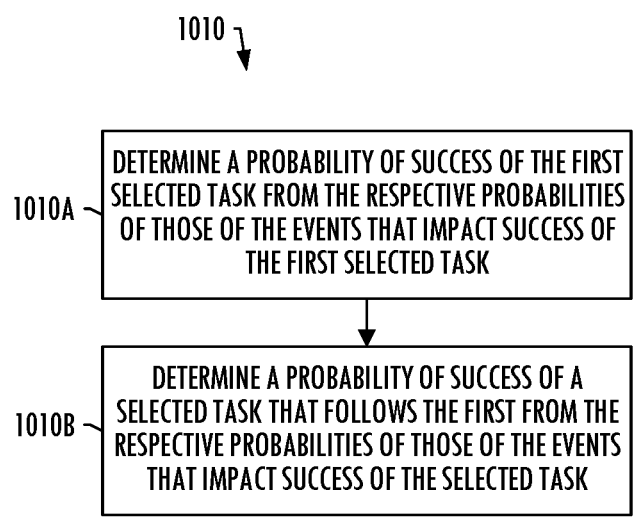
Figure 10C:
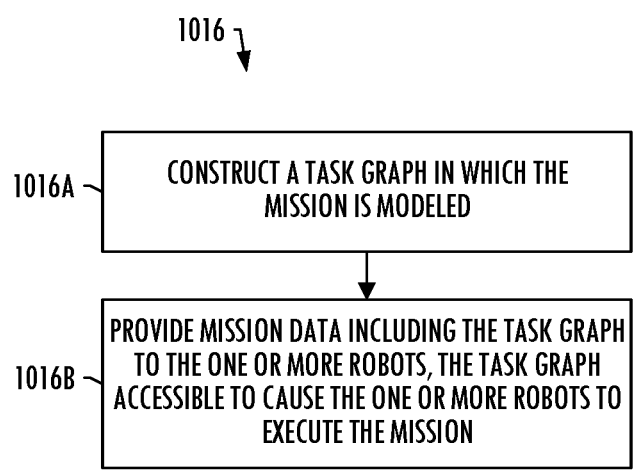
Figure 11A:
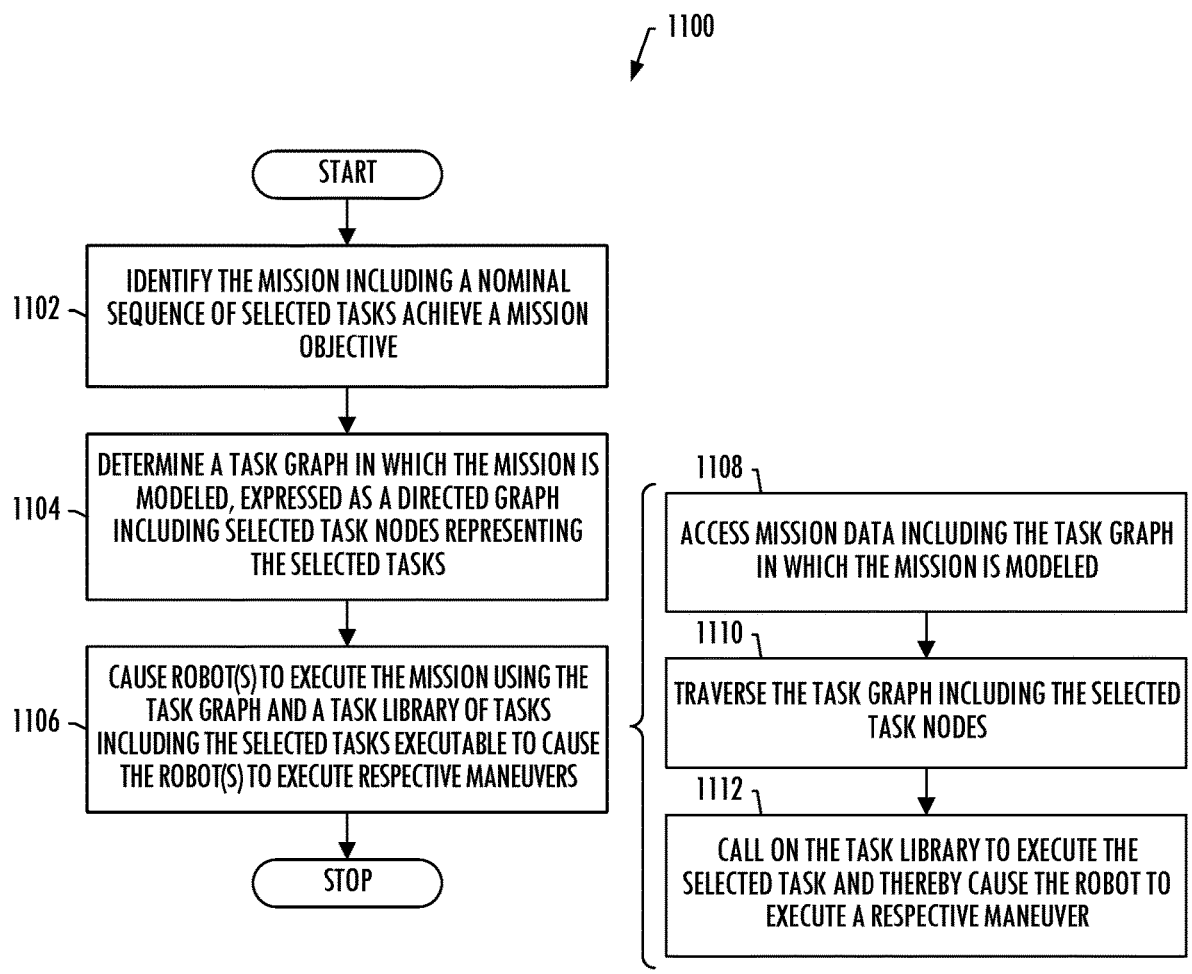
Figure 11B:
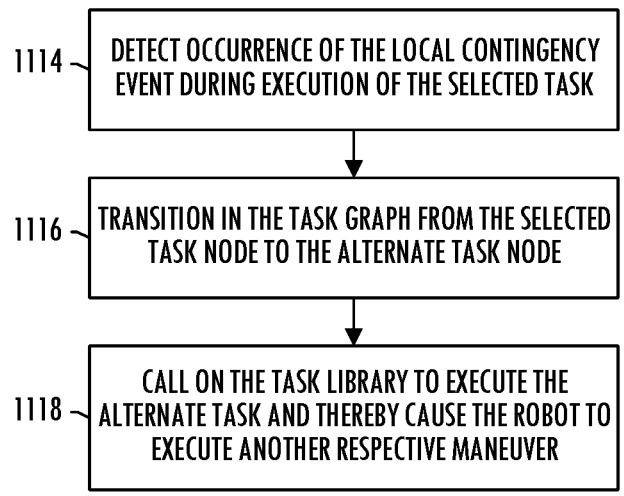
Figure 11C:
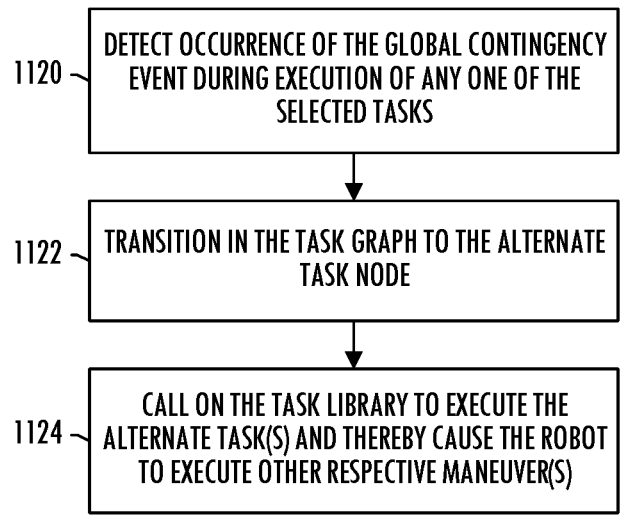
Figure 13A:
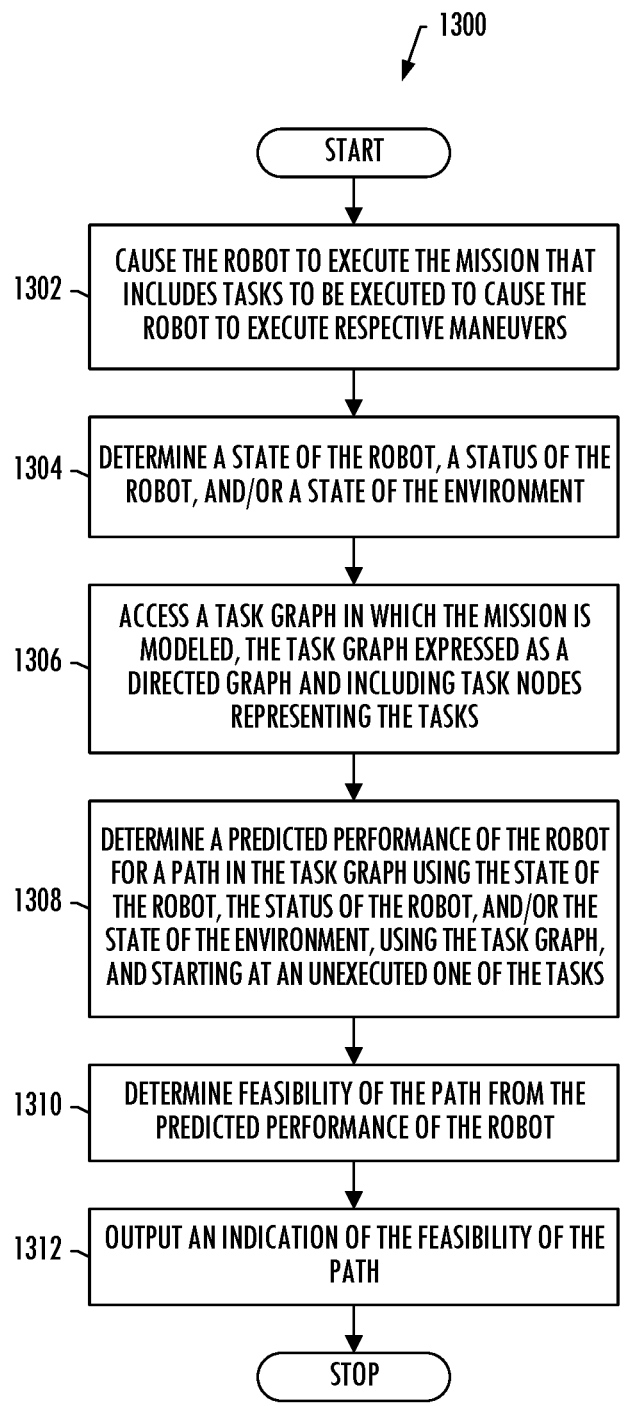
Figure 13B:
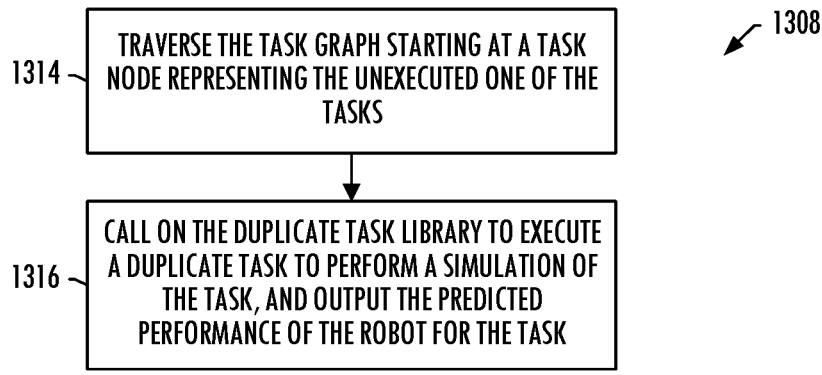
Figure 13C:
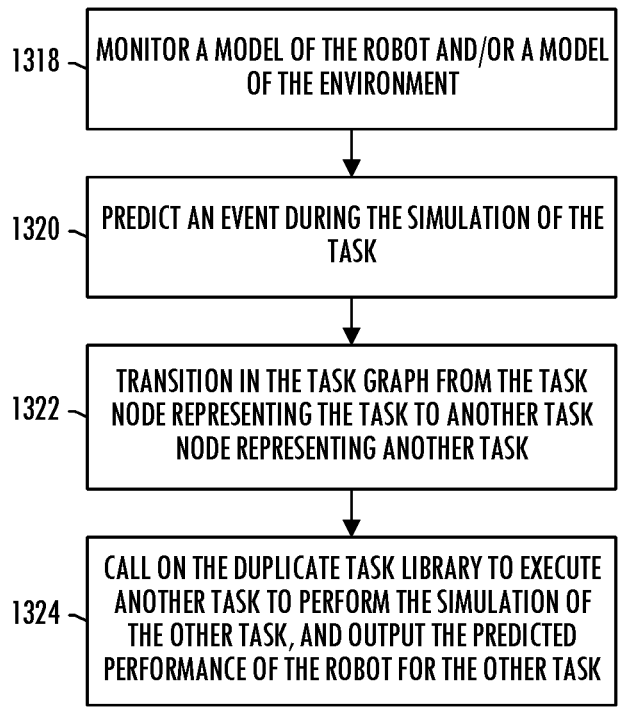
Figure 13D:
Figure 13E:
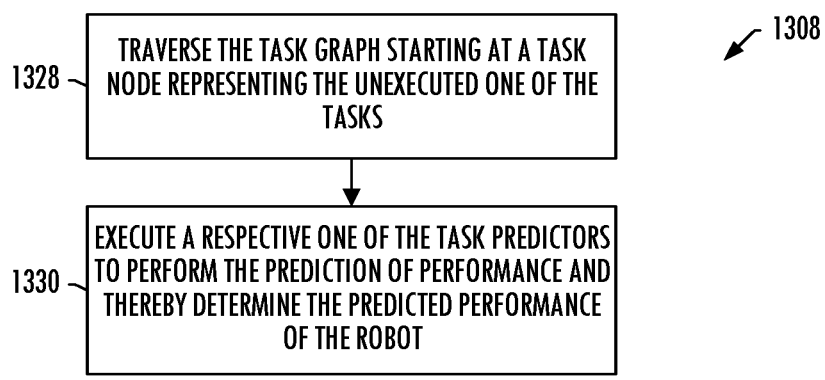
Figure 13F:
Figure 14:
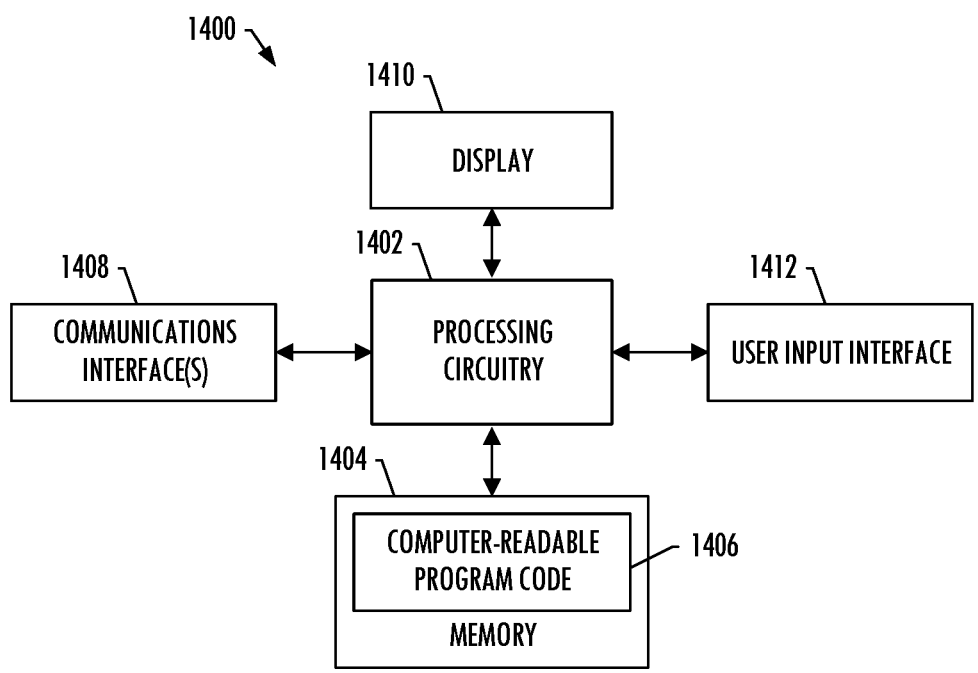

FIG. 3 more illustrates a mission management system (MMS) according to some example implementations;

FIG. 4 is a diagram of services that may be implemented by a mission planning subsystem of the MMS, according to some example implementations;

FIGS. 5A, 5B, 5C and 5D illustrate a task graph during planning a mission modeled in the task graph, according to some example implementations;

FIG. 6 is a diagram of additional or alternative services that may be implemented by one or more subsystems of the MMS, according to some example implementations;

FIG. 7 illustrates another task graph according to some example implementations;

FIGS. 8 and 9 illustrate a feasibility service according to various example implementations;

FIGS. 10A, 10B and 10C are flowcharts illustrating various steps in a method of causing one or more robots to execute a mission having one or more mission objectives, according to example implementations;

FIGS. 11A, 11B and 11C are flowcharts illustrating various steps in a method of causing one or more robots to execute a mission, according to example implementations of the present disclosure;

FIGS. 12A, 12B, 12C, 12D, and 12E are flowcharts illustrating various steps in a method of causing one or more robots to execute a mission in an environment, according to example implementations of the present disclosure;

FIGS. 13A, 13B, 13C, 13D, 13E and 13F are flowcharts illustrating various steps in a method of causing one or more robots to execute a mission in an environment, according to example implementations of the present disclosure; and FIG. 14 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
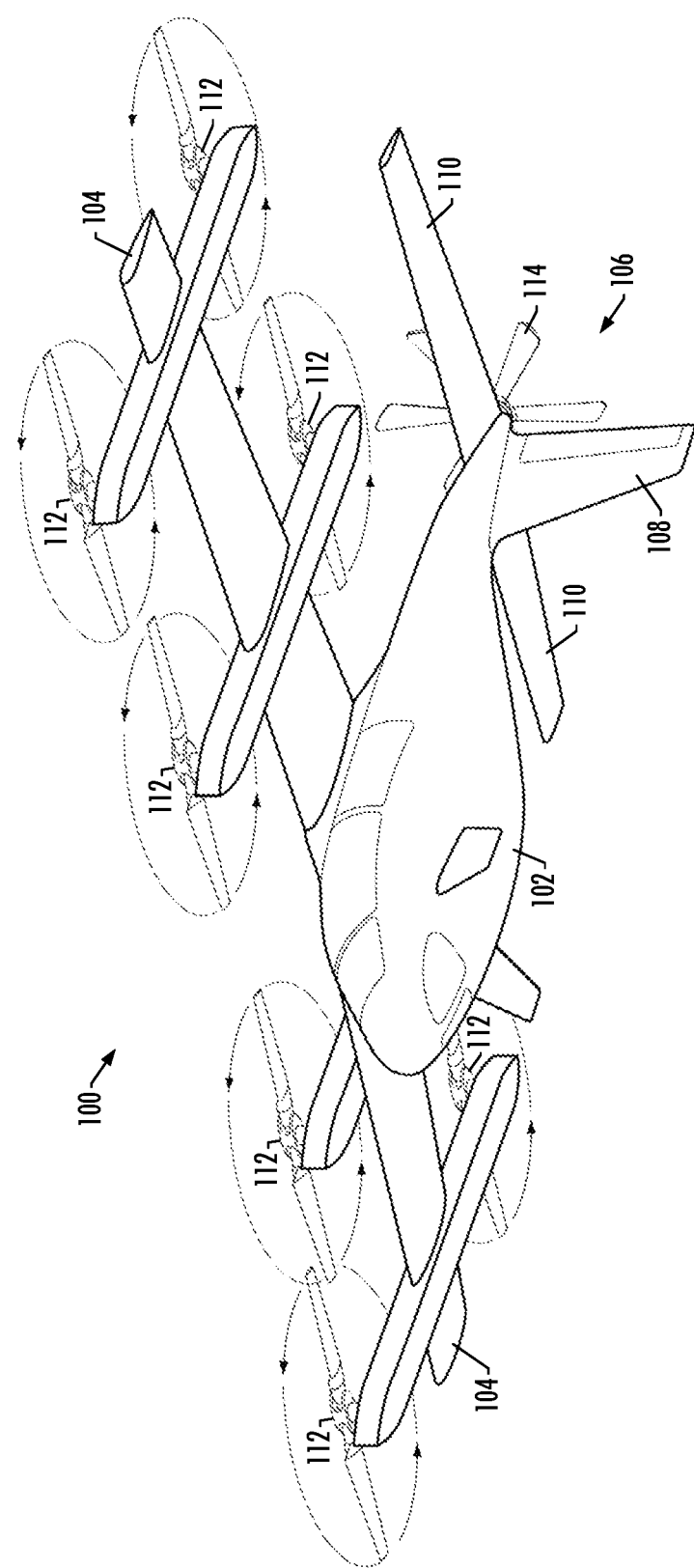
FIG. 1 illustrates one type of robot, namely, an unmanned aerial vehicle, that may benefit from example implementations of the present disclosure.

FIG. 1 illustrates one type of robot, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
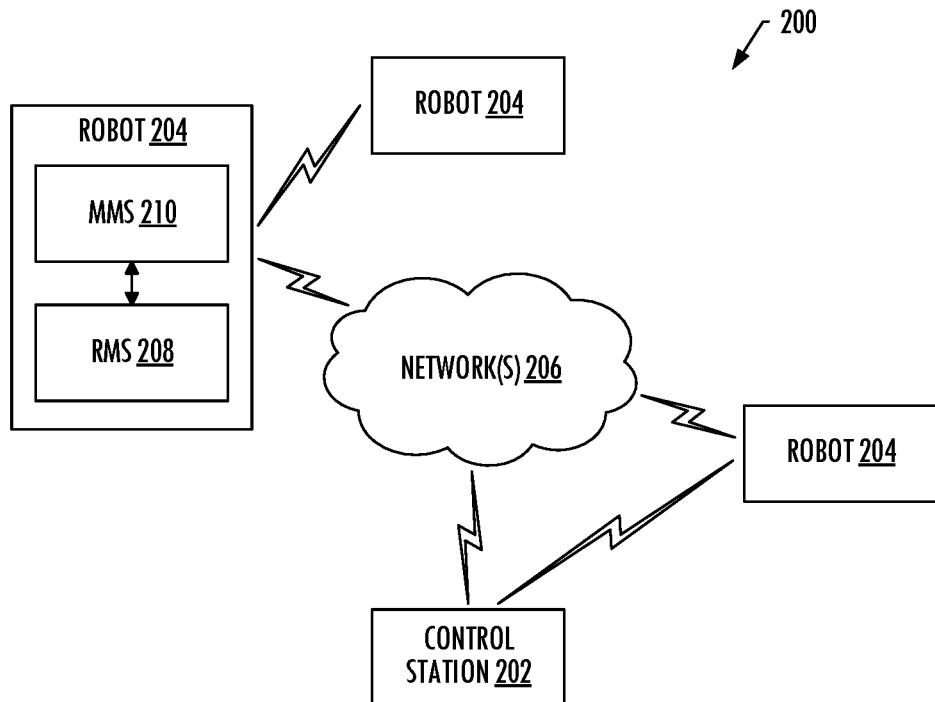
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots 204 (e.g., one or more UAVs 100). The control station provides facilities for communication with or control of the one or more robots, such as by wired or wireless data links directly or across one or more networks 206. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

The robot 204 includes a robot management system (RMS) 208 and a mission management system (MMS) 210. The RMS is a robot-specific subsystem configured to manage subsystems and other components of the robot. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS is configured to accept maneuver commands such as waypoints and/or steering commands, and control the robot to follow those maneuver commands. In the context of a vehicle, the RMS is at times referred to as a vehicle management system (VMS).

The MMS 210 is a subsystem configured to manage missions of the robot 204. A mission is a deployment of the robot (one or more robots) to achieve one or more mission objectives. A mission may be decomposed into maneuvers of the robot with optional sensor and/or effector scheduling, and the MMS may execute tasks to manage the robot to execute maneuvers with specific parameters and capabilities. In some examples, a mission may also include idle tasks in which the vehicle may idle while other mission systems operate. These idle tasks may include, for example, on-ground tasks, system startup tasks, tasks employing sensors or effectors, and the like. The MMS 210 includes subsystems to process sensor data to situational awareness, plan tasks for the robot 204 (or multiple robots), coordinate with teams to assign tasks, execute assigned tasks. The MMS is also configured to interface with the RMS 208, and in some examples the control station 202. Although the MMS is shown on the robot 204, the MMS may instead be at the control station; or in some examples, the MMS may be distributed between the robot and the control station.

In some examples, the MMS 210 provides a complete, end-to-end autonomy architecture with open system architecture standards and parameterized to allow rapid extension and reapplication to a variety of robots. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the robot 204, at the control station 202, or distributed between the robot and the control station. The subsystems may be configured to communicate with one another directly, over a communication bus 312, or across the network(s) 206 in examples in which the MMS is distributed between the robot and the control station.

The subsystems enable the MMS 210 of the robot 204 to interface with the system 200, perform situational awareness, plan a mission including a plurality of tasks, coordinate the plurality of tasks and thereby the mission with other robots 204, and execute the mission. For example, the MMS may use the interface subsystem 302 to interface with various sensors onboard the robot, the RMS 208, the control station 202 and/or other robots. The MMS may use the situational awareness subsystem 304 to acquire sensor data and maintain an awareness of the state of the environment in which the robot is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other robots and users, where agreed-upon tasks may then be executed by the MMS using the mission execution subsystem 310.

According to some example implementations of the present disclosure, various ones of the subsystems of the MMS 210 are configured to implement various software functionality or functionalities (at times referred to as services) to perform their respective functions. FIG. 4 is a diagram of services 400 that may be implemented by the mission planning subsystem 306 to plan or dynamically replan a mission. As shown, the services may include a task planner service 402 and a task allocation service 404.

A basic part of autonomy is a cost function to make decisions on any given set of actions, and a simple cost function is typically based on distance, time, or fuel is used by decision making algorithms. This simplifies the cost function to something trivial (yet still useful) to allow research into the more difficult generation and optimization of action sets. The services 400 of some implementations of the present disclosure determine a probability of success of a mission including sequence of selected tasks to be executed by one or more robots. The services provide a library of probabilities of events that impact success of tasks, which may be used to determine the probability of a single task. The probability of success may be determined for selected tasks across a mission, which may then be used in a cost function to evaluate the mission.

In particular, the task planner service 402 may acquire information about tasks and their characteristics, including performance data that includes expected results of task selection that can help decide whether or not tasks should be selected for the mission. This performance data may be used as a decision basis for other services of the mission planning subsystem 306 such as the task allocation service 404. The task allocation service reviews the performance data, and selects tasks and arranges the tasks in sequence. The task allocation service may also determine which robots 204 should execute the selected tasks. For these operations, the task allocation service may use evaluation criteria such as cost (in the context of a cost function).

The task planner service 402 is configured to receive inputs from a variety of sources, including a probability of success service 406 of the mission planning subsystem 306. As explained in greater detail below, the probability of success service may be used to determine probabilities of success of selected tasks. The performance data from the task planner service to the task allocation service 404 may include these probabilities of success. The task allocation service may use the probabilities of success of the selected tasks to determine a cost of the mission, which may be used to evaluate a mission.

According to example implementations, the task planner service 402 and the task allocation service 404 cooperate to plan a mission including a sequence of selected tasks to be executed by one or more robots 204 to achieve a mission objective. The task allocation service is configured to determine a probability of success of the mission objective from selected tasks of the sequence of tasks.

More particularly, the probability of success service 406 is configured to access a library 408 of probabilities of events that impact success of tasks of the robot(s); and identifying, from the library, respective probabilities of those of the events that impact success of the selected tasks. The probability of success service is configured to determine probabilities of success of the selected tasks from the respective probabilities of those of the events that impact success of the selected tasks.

The probabilities of events in the library 408 may be expressed in any of a number of different manners, and may be expressed in the same manner or in different manners across the events. The probability of an event may be expressed in the library as a value (e.g., a number between 0 and 1), or the probability may be expressed as a mathematical function form which the value may be determined. This may allow the probability of success service 406 to determine a probability of success of a selected task based on one or more conditions of selected task.

In some examples, the library 408 includes probabilities of events common to various tasks. These events may depend on the type of robot 204. Some examples of suitable events include operation critical failure (any operation critical subsystem failure, e.g., flight critical failure), mission critical failure (any mission critical subsystem failure), collision, bingo fuel, sensor detection of target, sensor tracking target, and the like.

A more particular example of a suitable event that may be covered in the library 408 in the case of an aerial robot is midair collision, and the probability of this event may be expressed as a function to determine the probability of violating midair collision distances based on current traffic conditions. Traffic position and velocity may be modeled as a distribution around the measurement. As the robot distribution overlaps with known traffic distributions in forward predictions, the probability of midair collision violation increases. A well-clear violation is another example of a suitable event covered in the library. This is similar to midair collision but with larger boundaries. The well-clear boundaries may be defined by regulatory authority (e.g., FAA) to express how close vehicles are allowed to operate without reporting the incident to the regulatory authority.

Other examples of suitable events that may be covered in the library 408 include route execution, fuel burn, ground collision, threats and the like. Route execution (or flight path execution in the case of an aerial robot) may be expressed as a function to determine the probability that a robot 204 will not be able to track a given path, which may be described as a series of waypoints that define a route the robot will travel. There may be a number of issues that could arise when a robot is following a route, each factoring into the probability of success. One issue may include catastrophic failure, and each robot may have a probability of catastrophic failure per hour (e.g., $10^{-9}$ for passenger vehicle), which integrated over the route may be the probability of a catastrophic failure. Other issues may include lower-level hazards that affect mission performance such as failure of the MMS 210 or one or more sensors, which may also be integrated over the route.

Fuel burn as an event may be accurately estimated and checked. In some examples, fuel burn may also factor in weather variation such as wind and turbulence that could affect how much fuel burn is required to reach the end of a route. Over the route of the robot 204 with an appropriate weather model, the probability of failure due to fuel burn can be determined.

Ground collision may be an issue for a robot 204 operating on or close to the ground. When the robot is on or close to the ground there may be a number of issues that can cause ground collision, such as navigation accuracy, ground map accuracy, maneuvering limits, reaction time, visibility and the like. Each of issues may add to the risk that determines the probability of success of a task executing on or close to the ground.

In some scenarios such as some military scenarios, threats may reduce the probability of success of a task. The probability for a known threat may be expressed as a function to determine the probability of the known threat incapacitating the robot 204. This function may include factors such as threat range, tracking, targeting, firing, interception probabilities and the like.

Again, the probability of success service 406 is configured to determine probabilities of success of the selected tasks from the respective probabilities of those of the events from the library 408 that impact success of the selected tasks (e.g., navigating route, enough fuel, finding target, prosecuting target). In some examples, the probability of success service is configured to determine the probability of success of a first selected task from the respective probabilities of those of the events that impact success of the first selected task. In mathematical notation, the probability of success for the first selected task $T_0$ may be expressed as follows:

$$P(T_0) = \bigcup_m E_m = \prod_{mn} P(E_m)$$

where $E_m$ is an event that impacts success of the selected task.

Likewise, in some examples, the probability of success service 406 is configured to determine the probability of success for a selected task that follows a first selected task from the respective probabilities of those of the events that impact success of the selected task. For the selected task that follows the first selected task, the respective probabilities are conditional given success of an immediately preceding selected task in the sequence of selected tasks. The probability of success for the selected task $T_n$, n>0 that follows the first selected task $T_0$ may be expressed as follows:

$$P(T_n) = P(T_n|T_{n-1})P(T_{n-1}) + P(T_n|\bar{T}_{n-1})P(\bar{T}_{n-1})$$

where $$P(T_n|T_{n-1}) = \bigcup_m E_m = \prod_m P(E_m|T_{n-1})$$

The task planner service 402 in some examples is configured to provide the probabilities of success of the selected tasks from the probability of success service 406 to the task allocation service 404, which is configured to determine the probability of success of the mission objective from the probabilities of success of the selected tasks. The probability of success of the mission objective may be expressed as follows:

$$P(O_k) = \prod_q P(T_q|T_{q-1})$$

where $O_k$ is objective k and $T_q$ is a final task that achieves objective k. There may be multiple sequences of selected tasks to achieve an objective, each of which may have a final task that aggregate to accomplish an objective. The above expression assumes that every selected task in the sequence is completed to achieve the objective.

The task allocation service 404 is configured to determine a cost of the mission from the probability of success of the mission objective, which may be used to evaluate the mission. In this regard, the robot(s) 204 may be caused to execute the mission when the cost of the mission meets a predetermined selection criterion.

In some examples in which the mission has a plurality of mission objectives, the mission includes respective sequences of selected tasks for respective ones of the plurality of mission objectives. In some of these examples, the task allocation service 404 is configured to determine probabilities of success of the plurality of mission objectives, and determine the cost of the mission from the probabilities of success of the plurality of mission objectives. In some further examples, the task allocation service is configured to determine the cost of the mission as a product of the probabilities of success of the plurality of mission objectives, or as a weighted mean of the probabilities of success of the plurality of mission objectives.

In particular, for example, the probability of success of a mission M may the probability of all objectives being achieved, which may be expressed as follows:

$$P(M) = \bigcup_k O_k = \prod_k P(O_k)$$

According to a weighted approach, the cost of the mission may be determined as:

$$C(M) = \frac{\sum_k W_k P(O_k)}{\sum_k W_k}$$

where $W_k$ is a weight for $P(O_k)$. In this expression, the cost of the mission is expressed as a sum of weighted probabilities rather than a product, which may more intuitively scale in the case an objective is not achievable.

In some examples in which the robot(s) 204 are caused to execute the mission, the task allocation service 404 is configured to construct a task graph in which the mission is modeled. The task graph is expressed as a directed graph and includes selected task nodes representing the selected tasks that are connected by edges representing transitions between the selected tasks. In some of these examples, the task allocation service is further configured to provide mission data including the task graph to the robot(s), and the task graph is accessible onboard the robot(s) to cause the robot(s) to execute the mission.

Returning to FIG. 3, in some even further examples, the mission data is provided from the mission planning subsystem 306 to the mission execution subsystem 310 of the MMS 210 (directly or via the mission coordination subsystem 308). The mission and in particular the selected tasks of the mission may then be executed through the mission execution subsystem using the mission data including the task graph. This may include the MMS configured to send one or more maneuver commands to the RMS 208 to control the robot to follow the maneuver commands and thereby execute maneuvers.

In some example implementations, the MMS 210 accounts for the possibility that the mission fails to execute exactly as planned because the environment or other robots 204 can experience unexpected and/or expected state changes. In some of these examples, the mission execution subsystem 310 periodically (or dynamically) checks a current predicted outcome of the mission plan throughout mission execution, and may call on one or more of the services 400 of the mission planning subsystem 306. If the probability of success of the mission or one or more selected tasks falls below a predetermined threshold value (e.g., a predetermined success percentage), a re-plan may be initiated.

In some examples in which the mission is modeled in a task graph, the task graph is a specific directed graph of tasks with defined transitions, assigned to one or more robots 204, which if executed, will accomplish objectives intrinsic to those tasks. A task may be executed by the mission execution subsystem 310 to cause one or more robots to execute one or more maneuvers with specific parameters and capabilities, such as by way of one or more maneuver commands. A task may include internal logic represented through one or more state machines, and may therefore be deterministic. In some examples, the internal logic of a task is defined during design of the system 200; and in some of these examples, the internal logic does not change during mission planning or execution.

A task may exhibit a list of available predecessors that serves to indicate possible predecessor-successor transition logic. During a mission, the mission execution subsystem 310 may cause the one or more robots 204 to execute maneuvers and thereby the mission task-by-task. If a task can be executed to its end, the mission execution subsystem may next call a task connected to "nominal completion" exit criteria of the task; otherwise, the mission execution subsystem may next call a task connected to specific non-nominal completion of the task. Nominal completion of a task means that a task completed as expected, with the exit criteria being the desired result that occurs in this case. The exit criteria may include, for example, arriving at a point, completing takeoff, completing landing, finishing a search pattern, finding an object being searched for, completing a map of an area, dropping a package at a delivery point, or the like. Non-nominal means that a task exited, but did not complete with its desired result, such as when an event occurs that results in the task terminating early. When the task connected to the specific non-nominal completion of the task is called, it may be because something has prevented the internal logic to flow along the nominal path and the execution ended up into one of the many predefined possible conclusions.

Figure 5A:
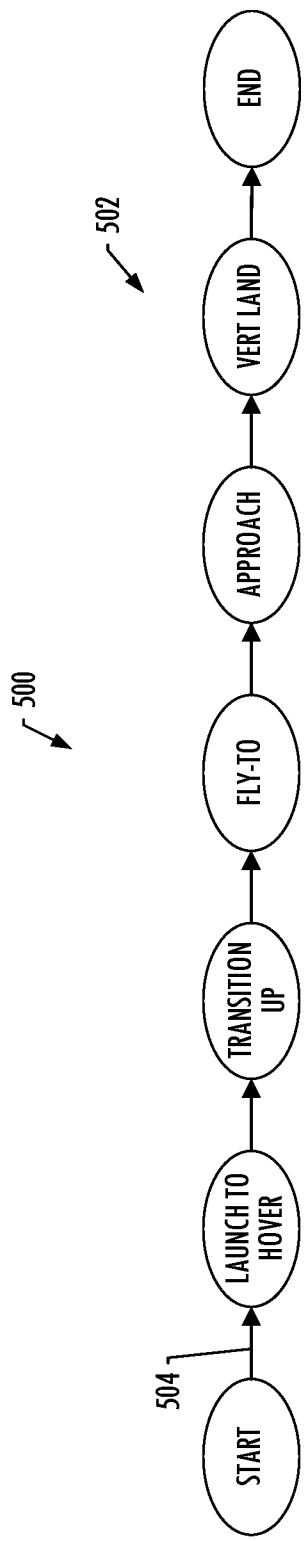

Predecessors and exit criteria for a task may be defined during its design of a task, and considered during mission planning. In this regard, MMS 210 may use the mission planning subsystem 306 to plan a mission in one or more phases. In one phase, a mission may be composed by a nominal sequence of selected tasks connected through nominal completion exit criteria and available predecessors. Task attributes such as routes may be added. In this regard, a task may be described by program code and may need one or more inputs to execute. These inputs are task attributes and they may at times relate to completion of the task. For example, if a task follows a waypoint route, then an attribute may be the waypoint route to follow. If the task is to search an area, the attribute may be the box defining the area to search. FIG. 5A illustrates an example of a task graph 500 for including selected task nodes 502 representing the selected tasks in a nominal sequence that are connected by edges 504 representing transitions between the selected tasks. As shown, sequences of edges connecting respective ones of the task nodes define paths in the task graph.

In another phase, specific behaviors may be assigned to failure modes of certain identified tasks. Local contingency events include contingency events that relate to specific task execution, and that are associated with specific tasks. One or more contingency paths may be added to create alternatives to the nominal sequence of selected tasks when one or more tasks the nominal sequence cannot be successfully executed. In some examples, a local contingency event may prevent a certain identified task from achieving its nominal completion exit criteria, and instead lead to a specific non-nominal completion of the task. Resolving a local contingency event may occur outside of the identified task by making use of one or more alternate tasks within the mission.

Figure 5B:
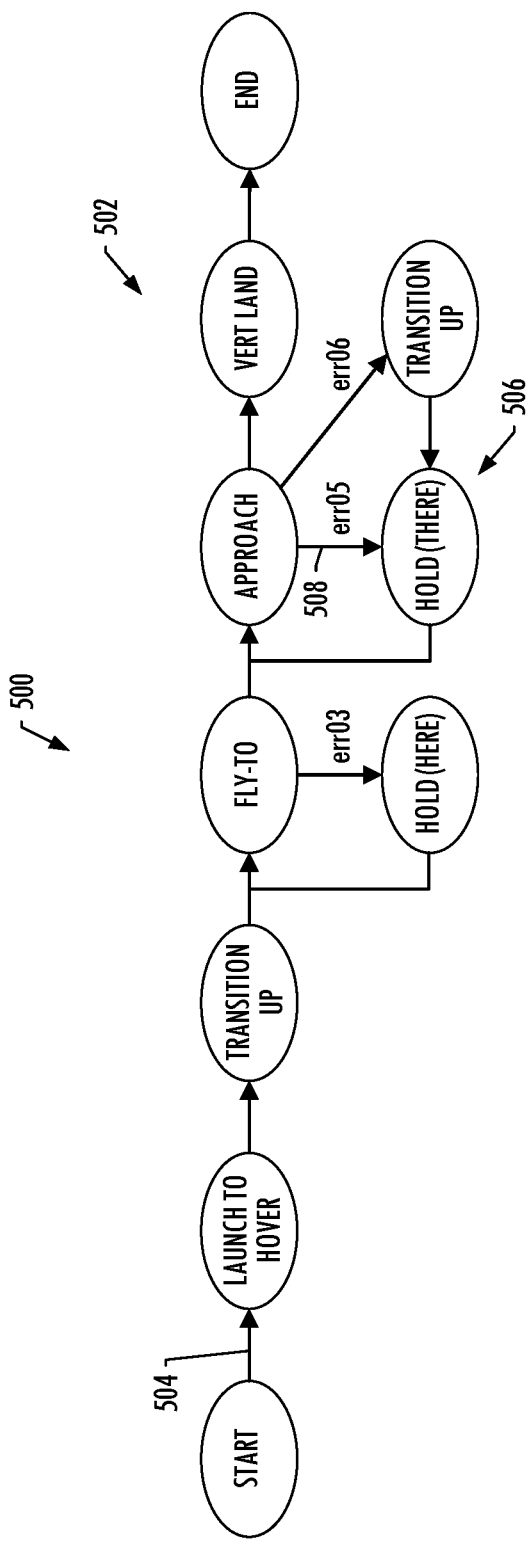

FIG. 5B illustrates the task graph 500 further including alternate task nodes 506 representing alternate tasks to be executed when a local contingency event occurs during execution of a selected task in the nominal sequence of selected tasks. For the selected task node and each alternate task node representing each alternate task, the task graph includes an edge 508 connecting the selected task node to the alternate task node that represents a transition from the selected task to the alternate task. For example, consider the "approach" task, and that the task cannot be successfully executed on a specified approach path when a strong tail wind (contingency event) occurs. The mission may be planned to include an alternative "hold" task to transition to a holding pattern, and/or a "transition up" task, to enable the robot 204 to use specific airport runways based on wind conditions.

In yet another phase, one or more alternate task graphs of alternate tasks assigned to global contingency events may be added. Global contingency events include contingency events that usually have nothing to do with the specific task execution and are instead related to one or more failures of the robot 204 (e.g., engine failure, navigation failure, link loss, battery failure). That is, global contingency events include contingency events that are not associated with a specific task. Global contingency events may also include contingency events in which a task fails execution in such a way that would normally produce a local contingency event, but the task graph does not otherwise include a contingency path for the local contingency event.

Figure 5C:
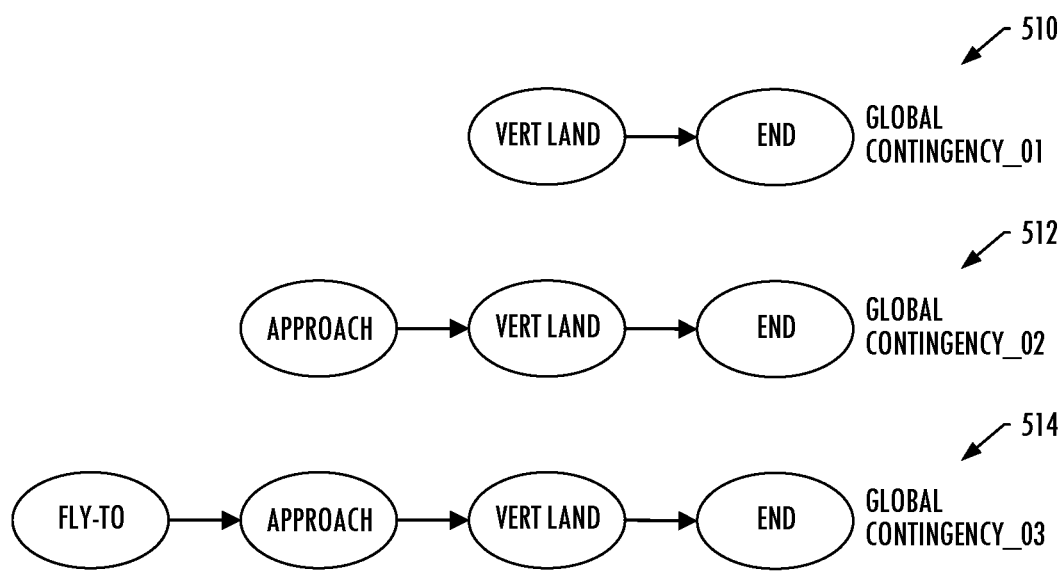

FIG. 5C illustrates three alternate task graphs 510, 512, 514 including respective sequences of alternate tasks nodes representing alternate tasks to be executed when a global contingency event occurs during execution of any one of the selected tasks in the nominal sequence. The alternate task graphs may be organized by levels of contingency. In this regard, a first alternate task graph 510 for a first global contingency event may call for the robot 204 to land immediately. A second alternate task graph 512 for a second global contingency event may call for the robot to land as soon as practical at a landing zone from which the robot took off. And a third alternate task graph 514 for a third global contingency event may call for the robot to land as soon as practical at a designated or selected landing zone.

Figure 5D:
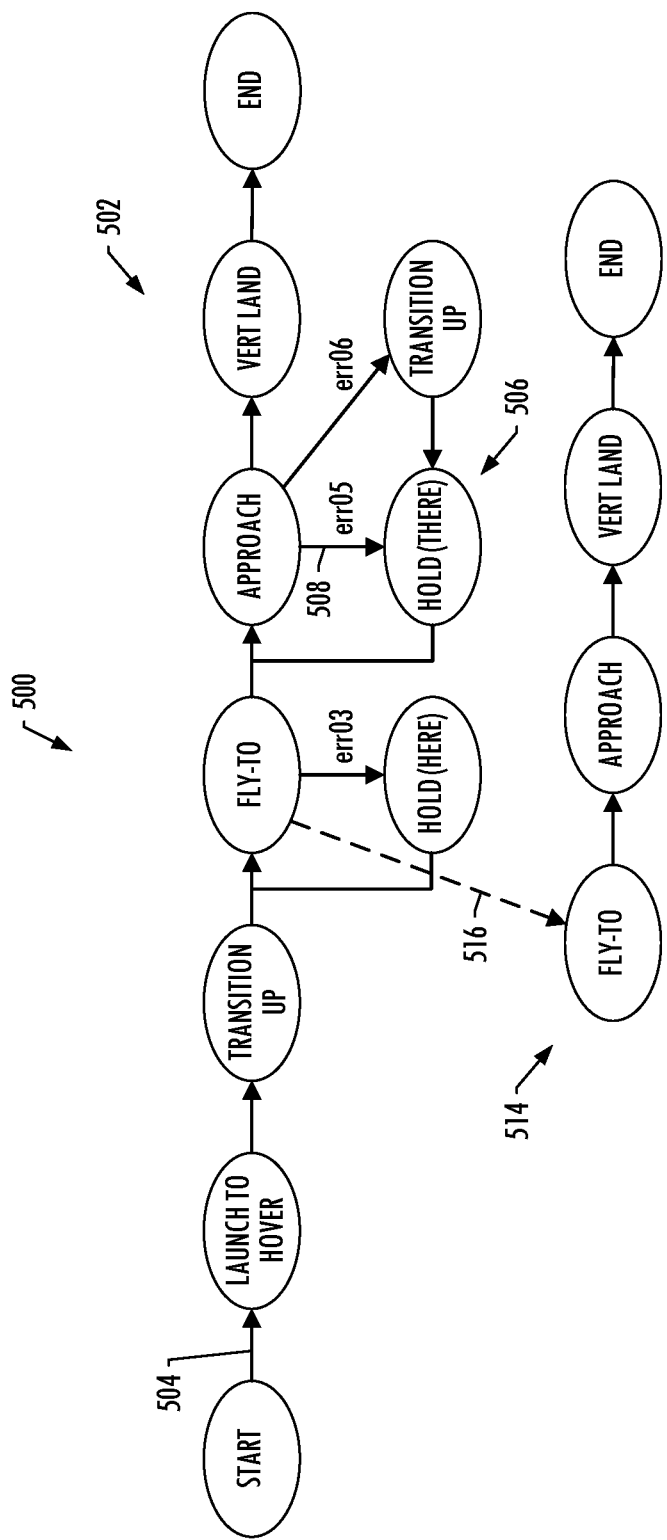

FIG. 5D illustrates the task graph 500 connected to, for example, the third alternate task graph 514 for the third global contingency event. The selected task nodes 502 are associated with the third alternate task graph, shown for one of the selected task nodes as a dashed edge 516 that represents association of the selected task with the alternate task graph.

Returning to FIG. 3, in some examples in which a mission is modeled in a task graph, tasks executable to cause a robot 204 or a type of robot to execute maneuvers (or idle in the case of idle tasks) may be designed, and a task library of tasks executable to cause the robot or type of robot to execute the maneuvers (or idle) may be developed. During mission planning, then, MMS 210 may use the mission planning subsystem 306 to plan a mission including a nominal sequence of selected tasks that are executable to cause one or more robots (of the type of robot) to execute maneuvers (and/or idle) to achieve a mission objective. The mission data provided by the mission planning subsystem to the mission execution subsystem 310 may include the task graph, and the mission execution subsystem may use the task graph and the task library to execute the mission. This may include the MMS configured to execute the selected tasks and send one or more maneuver commands (e.g., waypoints, steering commands) to the RMS 208 to control the robot to follow the maneuver commands and thereby execute the maneuvers.

FIG. 6 is a diagram of additional or alternative services 600 that may be implemented by one or more subsystems of the MMS 210. As shown, the services may include a mission manager 602 service that may be implemented by the mission execution subsystem 310. The mission manager service is generally configured to identify a mission including a nominal sequence of selected tasks that are executable to cause one or more robots 204 to execute maneuvers to achieve a mission objective. In some examples, the mission is identified from mission data 604.

The services 600 also include a task manager 606 service configured to access mission data 604 for the mission, and execute the selected tasks according to the mission data. In some examples, the task manager service is configured to determine a task graph 608 in which the mission is modeled, which in some examples may include the task manager service configured to access the task graph from the mission data. The task graph is expressed as a directed graph 610 and includes selected task nodes 612 representing the selected tasks that are connected by edges 614 representing transitions between the selected tasks. The task manager service is configured to execute the selected tasks using the task graph and a task library 616 of tasks 618 including the selected tasks 618A that are executable to cause the robot(s) to execute the maneuvers.

In some more particular examples, for a robot 204 of the robot(s), the task manager 606 service is configured to access the mission data 604 including the task graph 608 in which the mission is modeled. The task manager service is configured to traverse task graph including the selected task nodes 612. And when a selected task node representing a selected task is visited, the task manager service is configured to call on the task library 616 to execute the selected task 618A and thereby cause the robot to execute the maneuver.

As suggested above, a mission may contemplate the occurrence of various contingency events. These contingency events may include, for example, task-specific contingency events, local contingency events and/or global contingency events. A task-specific contingency event may be expressed in internal logic of a task 618. A local contingency event may be expressed in the task graph 608. A global contingency event may be expressed in an alternate task graph 608A.

For a task-specific contingency event, in some examples, a selected task in the nominal sequence causes the robot(s) 204 to execute a nominal maneuver, or an alternate maneuver when the task-specific contingency event occurs during execution of the nominal maneuver. In some of these examples, the task library 616 includes the selected task 618A executable to cause the robot(s) to execute the nominal maneuver, or the alternate maneuver when the task-specific contingency event occurs.

In the case of a local contingency event, in some examples, the mission further includes one or more alternate tasks to be executed when a local contingency event occurs during execution of a selected task in the nominal sequence. In some of these examples, the task graph 608 further includes one or more alternate task nodes 620 representing the one or more alternate tasks. The task graph also includes for the selected task node and each alternate task node representing each alternate task, an edge 622 connecting the selected task node to the alternate task node that represents a transition from the selected task to the alternate task. And further, the tasks 618 in the task library 616 further include the one or more alternate tasks 618B.

For a global contingency event, in some examples, the mission is associated with one or more alternate tasks to be executed when the global contingency event occurs during execution of any one of the selected tasks in the nominal sequence. In some of these examples, the selected task nodes 612 in the task graph 608 are associated with one or more alternate task graphs 608A of alternate task nodes 624 representing the one or more alternate tasks. This association may be represented for each selected task node and each alternate task graph by a dashed edge 626 connecting the selected task node to the alternate task graph. Similar before, the tasks 618 in the task library 616 also include these one or more alternate tasks 618B.

In some examples, the services 600 further include a contingency monitor 628 service, a contingency manager service 628 and/or a feasibility 632 service, which may be implemented by one or more subsystems of the MMS 210, such as the mission planning subsystem 306 or the mission execution subsystem 310. The contingency monitor service is configured to monitor for contingency events during the mission, and the contingency manager is configured to manage those contingency events. This may include the contingency monitor configured to determine at least one of a state of the robot 204, a status of the robot, or a state of the environment, some or all of which may be reflected in or determined from input data. The state of the robot is or includes its position, orientation, and time derivatives of those variables; and often, the state is the position, velocity, orientation, and orientation rates of the robot. The status of the robot refers to other information the robot may report, such as actuator modes, flight modes, navigation mode, GPS lock, communication throughput, and the like. In some examples, at least some of the input data may be provided by or determined from data provided by various sensors onboard the robot, the RMS 208 and/or the control station 202, which may interface with the MMS 210 using the interface subsystem 302. The state of the environment may in some examples be provided by or determined from data provided by the situational awareness subsystem 304 of the MMS.

The contingency monitor 628 service is configured to detect a contingency event, and report the contingency event to the task manager 606 service, directly or via the contingency manager 630 service. That is, in some examples, the contingency monitor service is configured to detect a contingency event, and report the contingency event to the task manager 6 service. In other examples, the contingency monitor service is configured to detect a contingency event, and report the contingency event to the contingency manager, which is in turn configured to notify the task manager service.

For a local contingency event detected during execution of a selected task, in some examples, the task manager 606 service is configured to transition in the task graph 608 from the selected task node to the alternate task node 620 (on edge 622), and call on the task library 616 to execute the alternate task 618B and thereby cause the robot to execute another maneuver (nominal for the alternate task). For a global contingency event detected during execution of any one of the selected tasks, in some examples, the task manager service is configured to transition to the alternate task graph 608A with one or more alternate task nodes 624 (and thereby transition to the one or more alternate task nodes), and call on the task library to execute the one or more alternate tasks 618B and thereby cause the robot to execute one or more other maneuvers.

According to some example implementations, events that are detectable by the contingency monitor 628 service may be may be classified into levels of contingency. In some examples, events may be classified into levels of contingency corresponding to the alternate task graphs 510, 512, 514 shown in FIG. 5C for some global contingency events. In other examples, the events may be classified into levels of contingency as follows:
 Land immediately (level 1)
 Land as soon as possible (level 2)
 Land as soon as practical (level 3)
 Hold pattern (level 4)
 Other robot or mission-specific contingencies The levels of contingency may be ordered such as in order of priority (e.g., land immediately being the highest, followed by land as soon as possible, followed by and as soon as practical, and so forth).

In some examples, then, the task manager 606 service is configured to access mission data 604 for the mission including or associated with tasks that are executable to cause the robot 204 to execute maneuvers, and execute the tasks according to the mission data. As the tasks are executed, the contingency monitor 628 service is configured to monitor at least one of the robot or the environment, and detect an event during execution of a task of the tasks. The event may be or include, for example, a local contingency event or a global contingency event. The contingency manager 630 service is configured to map the event to a level of contingency of a plurality of levels of contingency, and report the level of contingency to the task manager service. In response, the task manager service is configured to transition from the task to another of the tasks according to the level of contingency, and execute the other of the tasks.

In some examples in which the plurality of levels of contingency are in order of priority, that order may be used when multiple events are detected by the contingency monitor 628 service. In this regard, in some examples, the contingency manager 630 service is configured to map the multiple events to the respective levels of contingency, and report to the task manager service 606, the level of contingency that among the respective levels of contingency is higher (or highest) in the order of priority. The task manager service, then, is configured to transition from the task to the other of the tasks according to the higher level of contingency.

In some examples, the contingency monitor 628 service is configured to detect an event (another event) that the contingency manager 630 service is configured map to a non-maneuver action or procedure of the robot. The contingency manager service is configured cause the robot to perform the non-maneuver action or procedure. This may include the MMS 210 configured to send one or more commands to the RMS 208 to control the robot to perform the non-maneuver action or procedure.

In some examples in which the mission data 604 includes a task graph 608 in which the mission is modeled, the edges 614, 622, 626 representing transitions between the tasks (represented by the task nodes 612, 620, 624) may be associated with levels of contingency. This association, then, may direct the transition from one task to another when the level of contingency is reported to the task manager service 606.

FIG. 7 illustrates another example of a task graph 700 similar to the task graph 500 illustrated in FIG. 5D. The task graph 700 includes selected task nodes 702 representing the selected tasks in a nominal sequence that are connected by edges 704 representing transitions between the selected tasks. The task graph includes or is associated with alternate task nodes 706 representing alternate tasks to be executed when a contingency event (e.g., local contingency event, global contingency event) occurs during execution of a selected task in the nominal sequence of selected tasks. In the illustrated task graph, the edges are associated with levels of contingency for level 1, level 2 and level 3 contingencies, as well as a level 0 representing a nominal transition between task nodes in a sequence of task nodes. In some examples, one or more of the edges may be associated with multiple levels of contingency so that the same transition occurs when any of the multiple levels of contingency are detected.

Each task node 702 may be connected to one or more edges that represent transition from the task node (egress), and these one or more edges may cover all of the levels of contingency. For some tasks, however, the robot may be configured to ignore one or more levels of contingency. The task graph 700 may further include additional edges and nodes to cover these situations. As shown, for example, the task graph includes additional edges 708 associated with one or more levels of contingency, that connect task nodes to a ground node 710 representing "do nothing." When a contingency event with one of these levels of contingency is detected, the task manager service 606 may interpret the contingency event as a default global contingency event that may be predefined for the respective task nodes.

Returning to FIG. 6, again, the task manager service 606 may in some examples be configured to traverse the task graph 608 including the task nodes 612, 620, 624. When a task node representing the task is visited, the task manager service is configured to call on the task library 616 of the tasks 618 that are executable to cause the robot to execute the maneuvers. In some of these examples, the task manager service is configured to transition from the task node on an edge that connects the task node to another of the task nodes representing the other of the tasks; and in some of these examples, the edge is associated with the level of contingency.

As also shown in FIG. 6, the feasibility 632 service, which that may be implemented by one or more subsystems of the MMS 210, such as the mission planning subsystem 306 or the mission execution subsystem 310. The feasibility service is generally configured to determine feasibility of a path in the task graph 608 from the predicted performance of the robot for the path, and outputting an indication of the feasibility of the path. The mission planning subsystem or the mission execution subsystem may continue uninterrupted when the path is feasible. When the path is infeasible, the indication of the feasibility may indicate the path is infeasible, which may cause any of a number of different responses. These responses may include the mission planning subsystem configured to replan the path, or the mission execution subsystem reacting to the indication as an event such as a contingency event. Additionally or alternatively, for example, the indication may prompt an operator to intervene.

More particularly, in some examples, the feasibility 632 service is configured to determine at least one of a state of the robot 204, a status of the robot, or a state of the environment, some or all of which may be reflected in or determined from input data. In some examples, at least some of the input data may be provided by or determined from data provided by various sensors onboard the robot, the RMS 208 and/or the control station 202, which may interface with the MMS 210 using the interface subsystem 302. The state of the environment may in some examples be provided by or determined from data provided by the situational awareness subsystem 304 of the MMS.

The feasibility 632 service is configured to access the task graph 608 in which the mission is modeled, and determine a predicted performance of the robot 204 for a path such as a nominal path or an active in the task graph using the state of the robot, the status of the robot, and/or the state of the environment, using the task graph, and starting at an unexecuted one of the tasks. In some examples this includes the feasibility service configured to determine a prediction of at least one of a route traveled by the robot, a time taken by the robot, an end state of the robot, an end status of the robot, or a probability of success.

The predicted performance of the robot 204 is determined starting at an unexecuted one of the tasks. In this regard, the predicted performance and thus the feasibility of the path may be determined going forward in time from the unexecuted one of the tasks. Before execution of a mission, the unexecuted one of the tasks may be any of the tasks of the mission. As the mission is executed, the unexecuted one of the tasks may be any task subsequent to the task currently being executed, such as the next task in sequence. The path may be a nominal path or another path that may be an active path at the time. The feasibility 632 service may therefore repeatedly determine feasibility of the path particularly for those tasks of the mission that have not yet been executed.

The feasibility 632 service is configured to determine feasibility of the path from the predicted performance of the robot 204, and output an indication of the feasibility of the path. In some examples, the feasibility service configured to determine the feasibility of the path based on a comparison of the predicted performance and a threshold performance. In some examples, this threshold performance defines a boundary between a feasible path and an infeasible path.

FIG. 8 more particularly illustrates a feasibility 800 service that in some examples may correspond to the feasibility 632 service. As shown, the feasibility 800 service includes one or more sub-services (each an individual service) such as a duplicate task manager 806 service, a duplicate task library 816 of duplicate tasks 818, and a duplicate contingency monitor 828 service.

In some examples, the feasibility 800 service is configured to determine the predicted performance of the robot 204 using the duplicate task library 816 of duplicate tasks 818 executable to perform a simulation of the tasks. In some further examples, this includes the duplicate task manager 806 service configured to traverse the task graph 608 starting at a task node representing the unexecuted one of the tasks. And when the task node representing a task is visited, the duplicate task manager service is configured to call on the duplicate task library to execute a duplicate task to perform the simulation of the task, and output the predicted performance of the robot for the task.

In some examples, the duplicate contingency monitor 828 service is configured to monitor at least one of a model 830 of the robot 204 or a model 832 of the environment, and predict an event such as a contingency event during the simulation of the task by the duplicate task 818 of the duplicate task library 816. The model of the robot may depend on the state of the robot and/or the status of the robot, and the model of the environment may depend on the state of the environment. In some of these examples, the duplicate task manager 806 service is configured to transition from the task node representing the task to another task node representing another task in response to the event. And the duplicate task manager service is configured to call on the duplicate task library to execute another duplicate task to perform the simulation of the other task, and output the predicted performance of the robot for the other task.

Briefly returning to FIG. 6, the feasibility 632 service may therefore use simulation to predict performance of the robot 204. In other examples, the feasibility service may use more deterministic predictions of performance of the robot. These predictions may include those deterministic from algorithms with low or lower computational requirements (e.g., lower than the simulation), although some predictions may require more complicated algorithms.

FIG. 9 more particularly illustrates another feasibility 900 service that in some examples may correspond to the feasibility 632 service. As shown, the feasibility 900 service includes one or more sub-services (each an individual service) such as a duplicate task manager 906 service and task predictors 930.

In some examples, the feasibility 900 service is configured to determine the predicted performance of the robot 204 using the task predictors 930 that are executable to perform a prediction of performance and thereby determine the predicted performance of the robot for respective ones of the tasks. In particular, for example, the duplicate task manager 906 service is configured to traverse the task graph 608 starting at a task node representing the unexecuted one of the tasks. When the task node is visited, the duplicate task manager service is configured to execute a respective one of the task predictors to perform the prediction of performance and thereby determine the predicted performance of the robot for the unexecuted one of the tasks. In some examples, the task predictors perform predictions using the state of the robot, the status of the robot, and/or the state of the environment.

In some examples of the feasibility 800, 900 service in either FIG. 8 or FIG. 9, sequences of the edges 614, 622, 626 connecting respective ones of the task nodes 612, 620, 624 define paths in the task graph 608 (directed graph 610). The duplicate task manager 806, 906 service is configured to traverse the task graph on a nominal one of the paths (e.g., selected task nodes 612 connected by edges 614). In some of these examples, the feasibility 632 service is configured to determine feasibility of the nominal one of the paths. Also in some of these examples, the duplicate task manager is further configured to determine an alternate one of the paths in response to the nominal one of the paths being determined infeasible. The indication of the feasibility of the path may then include the alternate one of the paths as a proposed feasible path, which may be traversed by the task manager 606 service.

FIGS. 10A, 10B and 10C are flowcharts illustrating various steps in a method 1000 of causing one or more robots 204 to execute a mission having one or more mission objectives, according to example implementations of the present disclosure. As shown at block 1002 of FIG. 10A, the method includes planning the mission including a sequence of selected tasks to be executed by the one or more robots to achieve a mission objective. The method includes determining a probability of success of the mission objective from selected tasks of the sequence of tasks, as shown at block 1004.

More particularly, determining the probability of success of the mission objective includes accessing a library 408 of probabilities of events that impact success of tasks of the one or more robots; and identifying, from the library, respective probabilities of those of the events that impact success of the selected tasks, as shown at blocks 1006 and 1008. Determining the probability of success of the mission objective also includes determining probabilities of success of the selected tasks from the respective probabilities of those of the events that impact success of the selected tasks, as shown at block 1010. The probability of success of the mission objective is then determined from the probabilities of success of the selected tasks, as shown at block 1012.

Turning to FIG. 10B, for a first selected task in the sequence of selected tasks, determining the probabilities of success at block 1010 includes determining a probability of success of the first selected task from the respective probabilities of those of the events that impact success of the first selected task, as shown at block 1010A. Then for a selected task that follows a first selected task in the sequence of selected tasks, a probability of success of the selected task is determined from the respective probabilities of those of the events that impact success of the selected task, as shown at block 101B. The respective probabilities here are conditional given success of an immediately preceding selected task in the sequence of selected tasks.

Returning to FIG. 10A, the method 1000 also includes determining a cost of the mission from the probability of success of the mission objective, as shown at block 1014. In some examples in which the mission has a plurality of mission objectives, the mission includes respective sequences of selected tasks for respective ones of the plurality of mission objectives. In some of these examples, probabilities of success of the plurality of mission objectives are determined at block 1004, and the cost of the mission is determined at block 1014 from the probabilities of success of the plurality of mission objectives. In some further examples, the cost of the mission is determined at block 1014 as a product of the probabilities of success of the plurality of mission objectives, or as a weighted mean of the probabilities of success of the plurality of mission objectives.

The method 1000 further includes causing the one or more robots 204 to execute the mission when the cost of the mission meets a predetermined selection criterion, as shown at block 1016. In some examples, this includes constructing a task graph in which the mission is modeled, the task graph expressed as a directed graph and including selected task nodes representing the selected tasks that are connected by edges representing transitions between the selected tasks, as shown at block 1016A of FIG. 10C. Then as shown at block 1016B, mission data including the task graph is provided to the one or more robots, where the task graph is accessible onboard the one or more robots to cause the one or more robots to execute the mission.

FIGS. 11A, 11B and 11C are flowcharts illustrating various steps in a method 1100 of causing one or more robots 204 to execute a mission, according to example implementations of the present disclosure. The method includes identifying the mission including a nominal sequence of selected tasks that are executable to cause the one or more robots to execute maneuvers to achieve a mission objective, as shown at block 1102. The method includes determining a task graph 608 in which the mission is modeled, as shown at block 1104. The task graph is expressed as a directed graph 610 and includes selected task nodes 612 representing the selected tasks that are connected by edges 614 representing transitions between the selected tasks. The method also includes causing the one or more robots to execute the mission using the task graph and a task library 616 of tasks 618 including a selected task 618A executable to cause the one or more robots to execute a maneuver, as shown at block 1106.

In some examples, the selected task 618A in the nominal sequence of the selected tasks causes the one or more robots 204 to execute a nominal maneuver, or an alternate maneuver when a task-specific contingency event occurs during execution of the nominal maneuver. In some of these examples, the one or more robots are caused to execute the mission at block 1106 using the task library 616 that includes the selected task 618A executable to cause the one or more robots to execute the nominal maneuver, or the alternate maneuver when the task-specific contingency event occurs.

In some examples, the mission further includes one or more alternate tasks to be executed when a contingency event (e.g., local contingency event) occurs during execution of the selected task 618A in the nominal sequence of selected tasks. In some of these examples, the task graph 608 determined at block 1104 further includes one or more alternate task nodes 620 representing the one or more alternate tasks. The task graph may also include for the selected task node and each alternate task node representing each alternate task, an edge 622 connecting the selected task node to the alternate task node that represents a transition from the selected task to the alternate task.

In some examples, the mission is associated with one or more alternate tasks to be executed when a contingency event (e.g., global contingency event) occurs during execution of any one of the selected tasks in the nominal sequence of selected tasks. In some of these examples, determining the task graph 608 at block 1104 includes determining an alternate task graph 608A including one or more alternate task nodes 624 representing the one or more alternate tasks, each selected task node associated with the alternate task graph.

In some examples, causing the one or more robots 204 to execute the mission at block 1106 includes for a robot of the one or more robots, accessing mission data 604 including the task graph 608 in which the mission is modeled, as shown at block 1108. The task graph including the selected task nodes 612 is traversed, as shown at block 1110. And when a selected task node representing the selected task 618A is visited, the task library 616 is called on to execute the selected task and thereby cause the robot to execute the maneuver, as shown at block 1112.

Turning to FIG. 11B, in some examples, the mission further includes an alternate task to be executed when a contingency event (e.g., local contingency event) occurs during execution of the selected task, the task graph 608 further includes an alternate task node representing the alternate task, and the tasks 618 in the task library further include the alternate task 618B. In some of these examples, the method 1100 further includes for the robot 204 of the one or more robot, detecting occurrence of the contingency event during execution of the selected task, as shown at block 1114. The method includes transitioning in the task graph from the selected task node to the alternate task node, and calling on the task library 616 to execute the alternate task and thereby cause the robot to execute another maneuver, as shown at blocks 1116 and 1118.

Now to FIG. 11C, in some examples, the mission is associated with an alternate task to be executed when a contingency event (e.g., global contingency event) occurs during execution any one of the selected tasks, and the task graph 608 is associated an alternate task graph 608A including one or more alternate task nodes representing the one or more alternate tasks. The tasks 618 in the task library also include the one or more alternate tasks 618B. In some of these examples, the method 1100 further includes for the robot 204 of the one or more robot, detecting occurrence of the contingency event during execution of any one of the selected tasks, as shown at block 1120. The method includes transitioning to the alternate task graph, and calling on the task library 616 to execute the one or more alternate tasks and thereby cause the robot to execute one or more other maneuvers, as shown at blocks 1122 and 1124.

FIGS. 12A, 12B, 12C, 12D, and 12E are flowcharts illustrating various steps in a method 1200 of causing one or more robots 204 to execute a mission in an environment, according to example implementations of the present disclosure. The method includes, for a robot of the one or more robots, accessing mission data 604 for the mission including or associated with tasks that are executable to cause the robot to execute maneuvers, and executing the tasks according to the mission data to cause the robot to execute the maneuvers, as shown at blocks 1202 and 1204 of FIG. 12A. The method includes, as the tasks are executed, monitoring at least one of the robot or the environment, and detecting an event based on the monitoring, during execution of a task of the tasks, as shown at blocks 1206 and 1208. The method includes mapping the event to a level of contingency of a plurality of levels of contingency, as shown at block 1210. The method includes transitioning from the task to another of the tasks according to the level of contingency, and executing the other of the tasks, as shown at blocks 1212 and 1214.

In some examples, the event is a local contingency event that is detectable during execution of only certain tasks. In some of these examples, detecting the event at block 1208 includes detecting the local contingency event during execution of the task that is one of the certain tasks.

In some examples, the event is a global contingency event that is detectable during execution of any of the tasks. In some of these examples, detecting the event at block 1208 includes detecting the global contingency event during execution of the task that is any one of the tasks.

In some examples, the plurality of levels of contingency are in order of priority. In some of these examples, detecting the event at block 1208 includes detecting multiple events including the event, as shown at block 1208A of FIG. 12B. Also in some of these examples, mapping the event at block 1210 includes mapping the multiple events to the respective levels of contingency, as shown at block 1210A. And transitioning from the task to the other of the tasks at block 1212 includes transitioning from the task to another of the tasks according to the level of contingency that among the respective levels of contingency is higher in the order of priority, as shown at block 1212A.

Figure 12A:
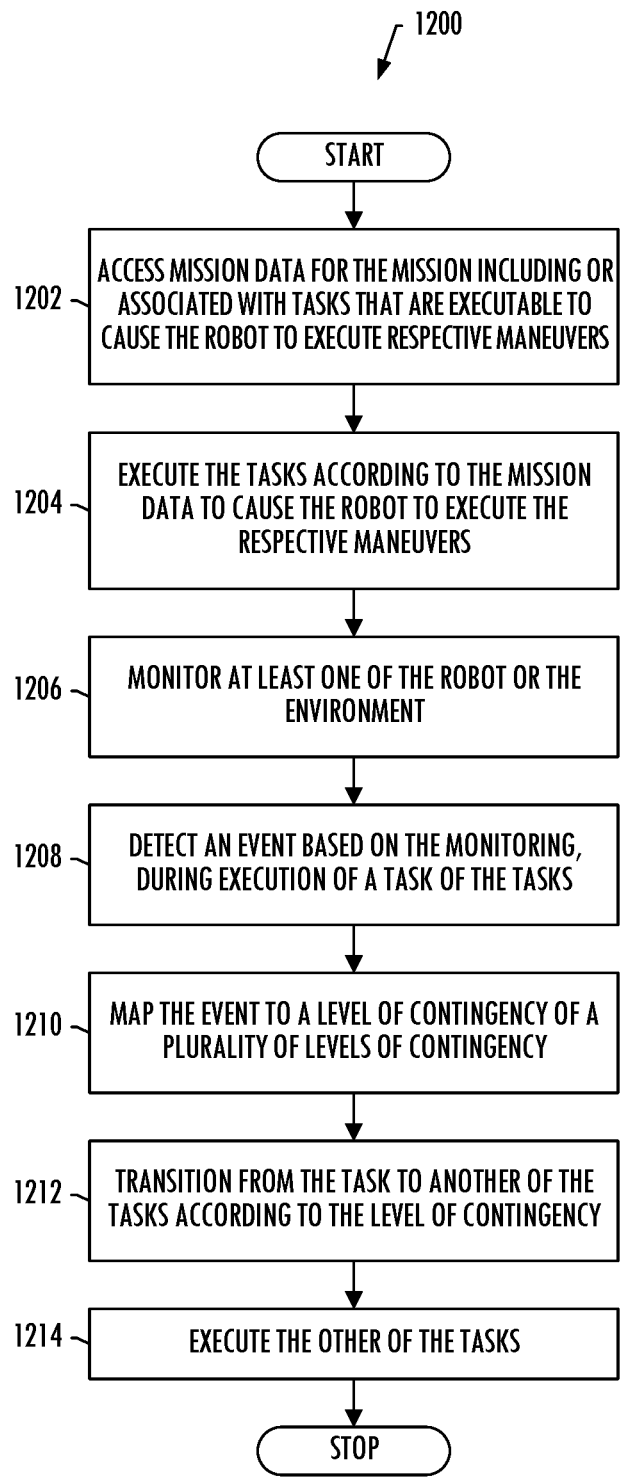
Figure 12B:
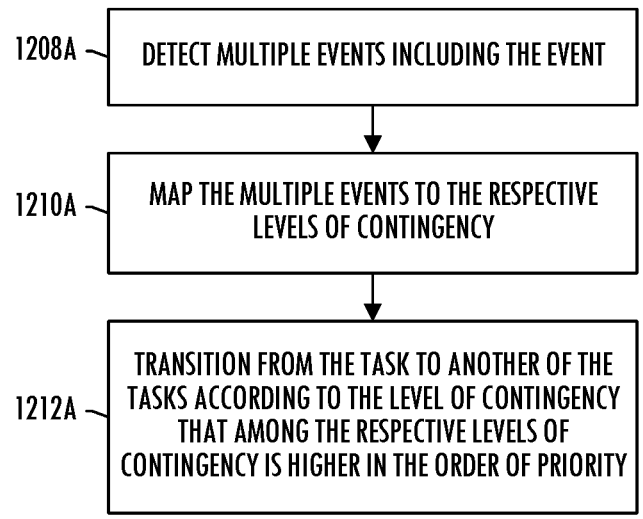
Figure 12C:
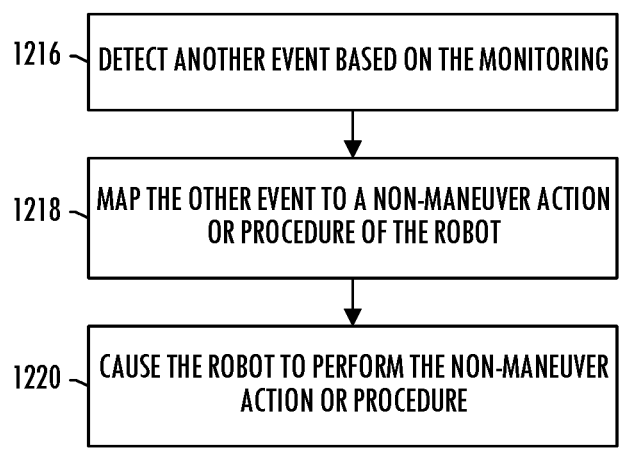
Figure 12D:
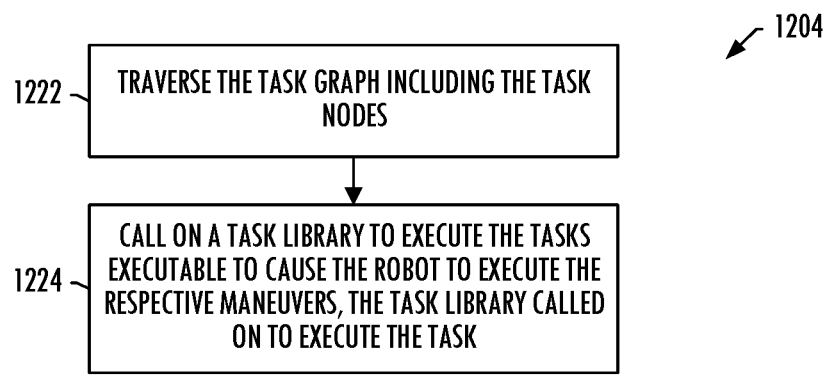

In some examples, the method 1200 further includes for the robot of the one or more robots, detecting another event based on the monitoring, as shown at block 1216 of FIG. 12C. Also in some of these examples, the method includes mapping the other event to a non-maneuver action or procedure of the robot, and causing the robot to perform the non-maneuver action or procedure, as shown at blocks 1218 and 1220.

In some examples, the mission data 604 includes a task graph 608 in which the mission is modeled. In some of these examples, the task graph expressed as a directed graph 610 and including task nodes 612, 620, 624 representing the tasks that are connected by edges 614, 622, 626 representing transitions between the tasks. Also in some of these examples, executing the tasks at block 1204 includes traversing the task graph including the task nodes, as shown at block 1222 of FIG. 12D. And the method 1200 includes, when a task node representing the task is visited, calling on a task library 616 of the tasks 618 that are executable to cause the robot to execute the maneuvers, as shown at block 1224. The task library called on to execute the task and thereby cause the robot to execute a maneuver.

Figure 12E:
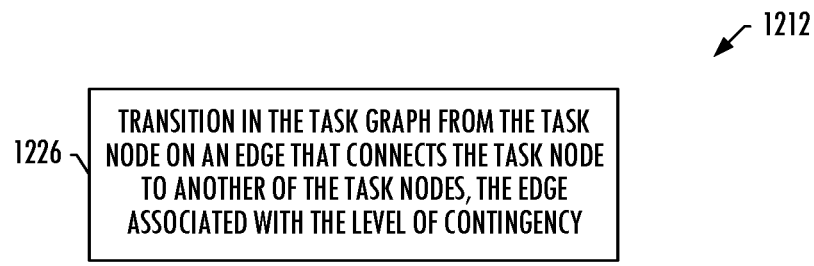

In some further examples, transitioning from the task to the other of the tasks at block 1212 includes transitioning from the task node 612, 620, 624 on an edge 614, 622, 626 that connects the task node to another of the task nodes representing the other of the tasks, as shown at block 1226 of FIG. 12E. In some of these examples, the edge is associated with the level of contingency.

FIGS. 13A, 13B, 13C, 13D, 13E and 13F are flowcharts illustrating various steps in a method 1300 of causing one or more robots 204 to execute a mission in an environment, according to example implementations of the present disclosure. The method includes, for a robot of the one or more robots, causing the robot to execute the mission that includes tasks that are executable to cause the robot to execute maneuvers, and determining at least one of a state of the robot, a status of the robot, or a state of the environment, as shown at blocks 1302 and 1304 of FIG. 13A.

The method 1300 includes accessing a task graph 608 in which the mission is modeled, as shown at block 1306. The task graph expressed is as a directed graph and including task nodes representing the tasks that are connected by edges representing transitions between the tasks, sequences of edges connecting respective ones of the task nodes defining paths in the task graph. The method includes determining a predicted performance of the robot 204 for a path in the task graph using the at least one of the state of the robot, the status of the robot, or the state of the environment, using the task graph, and starting at an unexecuted one of the tasks, as shown at block 1308. And the method includes determining feasibility of the path from the predicted performance of the robot, and outputting an indication of the feasibility of the path, as shown at blocks 1310 and 1312.

In some examples, determining the predicted performance at block 1308 includes determining a prediction of at least one of a route traveled by the robot 204, a time taken by the robot, an end state of the robot, an end status of the robot, or a probability of success.

In some examples, determining the feasibility of the path at block 1310 includes determining the feasibility of the path based on a comparison of the predicted performance and a threshold performance.

In some examples, determining the predicted performance of the robot 204 at block 1308 includes determining the predicted performance further using a duplicate task library 616 of duplicate tasks 618 executable to perform a simulation of the tasks. In some further examples, determining the predicted performance of the robot 204 includes traversing the task graph 608 starting at a task node representing the unexecuted one of the tasks, as shown at block 1314 of FIG. 13B. And when the task node representing a task is visited, the duplicate task library is called on to execute a duplicate task to perform the simulation of the task, and output the predicted performance of the robot for the task, as shown at block 1316.

In some examples, determining the predicted performance at block 1308 further includes monitoring at least one of a model 630 of the robot 204 or a model 632 of the environment, and predicting an event during the simulation of the task, as shown at blocks 1318 and 1320 of FIG. 13C. The method includes transitioning from the task node representing the task to another task node representing another task in response to the event, as shown at block 1322. And the method includes calling on the duplicate task library 616 to execute the another duplicate task 618 to perform the simulation of the other task, and output the predicted performance of the robot for the other task, as shown at block 1324.

In some examples, traversing the task graph at block 1314 includes traversing the task graph 608 on a nominal one of the paths. Also in some of these examples, determining feasibility of the path at block 1310 includes determining feasibility of the nominal one of the paths. And the method further includes determining an alternate one of the paths in response to the nominal one of the paths being determined infeasible as shown at block 1326 of FIG. 13D. The indication of the feasibility of the path in some of these examples includes the alternate one of the paths as a proposed feasible path.

Briefly returning to FIG. 13A, in some examples, the predicted performance of the robot 204 is determined at block 1308 further using task predictors that are executable to perform a prediction of performance and thereby determine the predicted performance of the robot for respective ones of the tasks. In some further examples, determining the predicted performance of the robot includes traversing the task graph 608 starting at a task node representing the unexecuted one of the tasks, as shown at block 1328 of FIG. 13E. And when the task node is visited, a respective one of the task predictors is executed to perform the prediction of performance and thereby determine the predicted performance of the robot for the unexecuted one of the tasks, as shown at block 1330.

In some even further examples, and traversing the task graph 608 at block 1328 includes traversing the task graph on a nominal one of the paths. In some of these examples, determining feasibility of the path at block 1310 includes determining feasibility of the nominal one of the paths. The method 1300 further includes determining an alternate one of the paths in response to the nominal one of the paths being determined infeasible, as shown at block 1332 of FIG. 13F. Similar to above, the indication of the feasibility of the path in some of these examples includes the alternate one of the paths as a proposed feasible path.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 14 illustrates an apparatus 1400 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1402 (e.g., processor unit) connected to a memory 1404 (e.g., storage device).

The processing circuitry 1402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1404 (of the same or another apparatus).

The processing circuitry 1402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1404 is generally any piece of computer hardware that is capable of storing information such as, for example, data, computer programs (e.g., computer-readable program code 1406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1404, the processing circuitry 1402 may also be connected to one or more interfaces for displaying, transmitting and/or receiving information. The interfaces may include a communications interface 1408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1410 and/or one or more user input interfaces 1412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1400 may include a processing circuitry 1402 and a computer-readable storage medium or memory 1404 coupled to the processing circuitry, where the processing circuitry is configured to execute computer-readable program code 1406 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for causing one or more robots to execute a mission having one or more mission objectives, the apparatus comprising a memory having computer-readable program code stored therein; and processing circuitry configured to access the memory, and execute the computer-readable program code to cause the apparatus to at least:

plan the mission including a sequence of selected tasks to be executed by the one or more robots to achieve a mission objective; determine a probability of success of the mission objective from selected tasks of the sequence of tasks, including the apparatus caused to at least: access a library of probabilities of events that impact success of tasks of the one or more robots; identify, from the library, respective probabilities of those of the events that impact success of the selected tasks; determine probabilities of success of the selected tasks from the respective probabilities of those of the events that impact success of the selected tasks; and determine the probability of success of the mission objective from the probabilities of success of the selected tasks; determine a cost of the mission from the probability of success of the mission objective; and cause the one or more robots to execute the mission when the cost of the mission meets a predetermined selection criterion.

Clause 2. The apparatus of clause 1, wherein the apparatus caused to determine the probabilities of success of the selected tasks includes, for a first selected task in the sequence of selected tasks, the apparatus caused to determine a probability of success of the first selected task from the respective probabilities of those of the events that impact success of the first selected task.

Clause 3. The apparatus of clause 1 or clause 2, wherein the apparatus caused to determine the probabilities of success of the selected tasks includes, for a selected task that follows a first selected task in the sequence of selected tasks, the apparatus caused to determine a probability of success of the selected task from the respective probabilities of those of the events that impact success of the selected task, the respective probabilities being conditional given success of an immediately preceding selected task in the sequence of selected tasks.

Clause 4. The apparatus of any of clauses 1 to 3, wherein the one or more mission objectives are a plurality of mission objectives, and the mission includes respective sequences of selected tasks for respective ones of the plurality of mission objectives, and wherein the apparatus caused to determine the probability of success of the mission objective includes the apparatus caused to determine probabilities of success of the plurality of mission objectives, and the apparatus caused to determine the cost of the mission includes the apparatus caused to determine the cost of the mission from the probabilities of success of the plurality of mission objectives.

Clause 5. The apparatus of clause 4, wherein the apparatus caused to determine the cost of the mission includes the apparatus caused to determine the cost of the mission as a product of the probabilities of success of the plurality of mission objectives.

Clause 6. The apparatus of clause 4 or clause 5, wherein the apparatus caused to determine the cost of the mission includes the apparatus caused to determine the cost of the mission as a weighted mean of the probabilities of success of the plurality of mission objectives.

Clause 7. The apparatus of any of clauses 1 to 6, wherein the apparatus caused to cause the one or more robots to execute the mission comprises the apparatus caused to at least construct a task graph in which the mission is modeled, the task graph expressed as a directed graph and including selected task nodes representing the selected tasks that are connected by edges representing transitions between the selected tasks; and provide mission data including the task graph to the one or more robots, the task graph accessible onboard the one or more robots to cause the one or more robots to execute the mission.

Clause 8. A method of causing one or more robots to execute a mission having one or more mission objectives, the method comprising planning the mission including a sequence of selected tasks to be executed by the one or more robots to achieve a mission objective; determining a probability of success of the mission objective from selected tasks of the sequence of tasks, including: accessing a library of probabilities of events that impact success of tasks of the one or more robots; identifying, from the library, respective probabilities of those of the events that impact success of the selected tasks; determining probabilities of success of the selected tasks from the respective probabilities of those of the events that impact success of the selected tasks; and determining the probability of success of the mission objective from the probabilities of success of the selected tasks; determining a cost of the mission from the probability of success of the mission objective; and causing the one or more robots to execute the mission when the cost of the mission meets a predetermined selection criterion.

Clause 9. The method of clause 8, wherein determining the probabilities of success of the selected tasks includes for a first selected task in the sequence of selected tasks determining a probability of success of the first selected task from the respective probabilities of those of the events that impact success of the first selected task.

Clause 10. The method of clause 8 or clause 9, wherein determining the probabilities of success of the selected tasks includes for a selected task that follows a first selected task in the sequence of selected tasks determining a probability of success of the selected task from the respective probabilities of those of the events that impact success of the selected task, the respective probabilities being conditional given success of an immediately preceding selected task in the sequence of selected tasks.

Clause 11. The method of any of clauses 8 to 10, wherein the one or more mission objectives are a plurality of mission objectives, and the mission includes respective sequences of selected tasks for respective ones of the plurality of mission objectives, and wherein determining the probability of success of the mission objective includes determining probabilities of success of the plurality of mission objectives, and determining the cost of the mission includes determining the cost of the mission from the probabilities of success of the plurality of mission objectives.

Clause 12. The method of clause 11, wherein determining the cost of the mission includes determining the cost of the mission as a product of the probabilities of success of the plurality of mission objectives.

Clause 13. The method of clause 11 or clause 12, wherein determining the cost of the mission includes determining the cost of the mission as a weighted mean of the probabilities of success of the plurality of mission objectives.

Clause 14. The method of any of clauses 8 to 13, wherein causing the one or more robots to execute the mission comprises constructing a task graph in which the mission is modeled, the task graph expressed as a directed graph and including selected task nodes representing the selected tasks that are connected by edges representing transitions between the selected tasks; and providing mission data including the task graph to the one or more robots, the task graph accessible onboard the one or more robots to cause the one or more robots to execute the mission.

Clause 15. A computer-readable storage medium for causing one or more robots to execute a mission having one or more mission objectives, the computer-readable storage medium being non-transitory and having computer-readable program code stored therein that, in response to execution by processing circuitry, causes an apparatus to at least plan the mission including a sequence of selected tasks to be executed by the one or more robots to achieve a mission objective; determine a probability of success of the mission objective from selected tasks of the sequence of tasks, including the apparatus caused to at least: access a library of probabilities of events that impact success of tasks of the one or more robots; identify, from the library, respective probabilities of those of the events that impact success of the selected tasks; determine probabilities of success of the selected tasks from the respective probabilities of those of the events that impact success of the selected tasks; and determine the probability of success of the mission objective from the probabilities of success of the selected tasks; determine a cost of the mission from the probability of success of the mission objective; and cause the one or more robots to execute the mission when the cost of the mission meets a predetermined selection criterion.

Clause 16. The computer-readable storage medium of clause 15, wherein the apparatus caused to determine the probabilities of success of the selected tasks includes, for a first selected task in the sequence of selected tasks, the apparatus caused to determine a probability of success of the first selected task from the respective probabilities of those of the events that impact success of the first selected task.

Clause 17. The computer-readable storage medium of clause 15 or clause 16, wherein the apparatus caused to determine the probabilities of success of the selected tasks includes, for a selected task that follows a first selected task in the sequence of selected tasks, the apparatus caused to determine a probability of success of the selected task from the respective probabilities of those of the events that impact success of the selected task, the respective probabilities being conditional given success of an immediately preceding selected task in the sequence of selected tasks.

Clause 18. The computer-readable storage medium of any of clauses 15 to 17, wherein the one or more mission objectives are a plurality of mission objectives, and the mission includes respective sequences of selected tasks for respective ones of the plurality of mission objectives, and wherein the apparatus caused to determine the probability of success of the mission objective includes the apparatus caused to determine probabilities of success of the plurality of mission objectives, and the apparatus caused to determine the cost of the mission includes the apparatus caused to determine the cost of the mission from the probabilities of success of the plurality of mission objectives.

Clause 19. The computer-readable storage medium of clause 18, wherein the apparatus caused to determine the cost of the mission includes the apparatus caused to determine the cost of the mission as a product of the probabilities of success of the plurality of mission objectives.

Clause 20. The computer-readable storage medium of clause 18 or clause 19, wherein the apparatus caused to determine the cost of the mission includes the apparatus caused to determine the cost of the mission as a weighted mean of the probabilities of success of the plurality of mission objectives.

Clause 21. The computer-readable storage medium of any of clauses 15 to 20, wherein the apparatus caused to cause the one or more robots to execute the mission comprises the apparatus caused to at least construct a task graph in which the mission is modeled, the task graph expressed as a directed graph and including selected task nodes representing the selected tasks that are connected by edges representing transitions between the selected tasks; and provide mission data including the task graph to the one or more robots, the task graph accessible onboard the one or more robots to cause the one or more robots to execute the mission.

Clause 22. An apparatus for causing one or more robots to execute a mission, the apparatus comprising a memory having computer-readable program code stored therein; and processing circuitry configured to access the memory, and execute the computer-readable program code to cause the apparatus to at least: identify the mission including a nominal sequence of selected tasks that are executable to cause the one or more robots to execute maneuvers to achieve a mission objective; determine a task graph in which the mission is modeled, the task graph expressed as a directed graph and including selected task nodes representing the selected tasks that are connected by edges representing transitions between the selected tasks; and cause the one or more robots to execute the mission using the task graph and a task library of tasks including a selected task executable to cause the one or more robots to execute a maneuver.

Clause 23. The apparatus of clause 22, wherein the selected task in the nominal sequence of the selected tasks causes the one or more robots to execute a nominal maneuver, or an alternate maneuver when a task-specific contingency event occurs during execution of the nominal maneuver, and wherein the apparatus is caused to cause the one or more robots to execute the mission using the task library that includes the selected task executable to cause the one or more robots to execute the nominal maneuver, or the alternate maneuver when the task-specific contingency event occurs.

Clause 24. The apparatus of clause 22 or clause 23, wherein the mission further includes one or more alternate tasks to be executed when a contingency event occurs during execution of the selected task in the nominal sequence of selected tasks, and wherein the apparatus is caused to determine the task graph further including one or more alternate task nodes representing the one or more alternate tasks.

Clause 25. The apparatus of any of clauses 22 to 24, wherein the mission is associated with one or more alternate tasks to be executed when a contingency event occurs during execution of any one of the selected tasks in the nominal sequence of selected tasks, and wherein the apparatus caused to determine the task graph includes the apparatus caused to determine an alternate task graph including one or more alternate task nodes representing the one or more alternate tasks, each selected task node associated with the alternate task graph.

Clause 26. The apparatus of any of clauses 22 to 25, wherein the apparatus caused to cause the one or more robots to execute the mission includes, for a robot of the one or more robots, the apparatus caused to at least access mission data including the task graph in which the mission is modeled; traverse the task graph including the selected task nodes; and when a selected task node representing the selected task is visited, call on the task library to execute the selected task and thereby cause the robot to execute the maneuver.

Clause 27. The apparatus of clause 26, wherein the mission further includes an alternate task to be executed when a contingency event occurs during execution of the selected task, the task graph further includes an alternate task node representing the alternate task, and the tasks in the task library further include the alternate task, and wherein for the robot of the one or more robots, the processing circuitry is configured to execute the computer-readable program code to cause the apparatus to further at least detect occurrence of the contingency event during execution of the selected task; transition in the task graph from the selected task node to the alternate task node; and call on the task library to execute the alternate task and thereby cause the robot to execute another maneuver.

Clause 28. The apparatus of clause 26 or clause 27, wherein the mission is associated with one or more alternate tasks to be executed when a contingency event occurs during execution any one of the selected tasks, the task graph is associated with an alternate task graph including one or more alternate task nodes representing the one or more alternate tasks, and the tasks in the task library further include the one or more alternate tasks, and wherein for the robot of the one or more robots, the processing circuitry is configured to execute the computer-readable program code to cause the apparatus to further at least detect occurrence of the contingency event during execution of any one of the selected tasks: transition to the alternate task graph: and call on the task library to execute the one or more alternate tasks and thereby cause the robot to execute one or more other maneuvers.

Clause 29. A method of causing one or more robots to execute a mission, the method comprising identifying the mission including a nominal sequence of selected tasks that are executable to cause the one or more robots to execute maneuvers to achieve a mission objective; determining a task graph in which the mission is modeled, the task graph expressed as a directed graph and including selected task nodes representing the selected tasks that are connected by edges representing transitions between the selected tasks; and causing the one or more robots to execute the mission using the task graph and a task library of tasks including a selected task executable to cause the one or more robots to execute a maneuver.

Clause 30. The method of clause 29, wherein the selected task in the nominal sequence of the selected tasks causes the one or more robots to execute a nominal maneuver, or an alternate maneuver when a task-specific contingency event occurs during execution of the nominal maneuver, and wherein causing the one or more robots to execute the mission includes causing the one or more robots to execute the mission using the task library that includes the selected task executable to cause the one or more robots to execute the nominal maneuver, or the alternate maneuver when the task-specific contingency event occurs.

Clause 31. The method of clause 29 or clause 30, wherein the mission further includes one or more alternate tasks to be executed when a contingency event occurs during execution of the selected task in the nominal sequence of selected tasks, and wherein determining the task graph includes determining the task graph further including one or more alternate task nodes representing the one or more alternate tasks.

Clause 32. The method of any of clauses 29 to 31, wherein the mission is associated with one or more alternate tasks to be executed when a contingency event occurs during execution of any one of the selected tasks in the nominal sequence of selected tasks, and wherein determining the task graph includes determining an alternate task graph including one or more alternate task nodes representing the one or more alternate tasks, each selected task node associated with the alternate task graph.

Clause 33. The method of any of clauses 29 to 32, wherein causing the one or more robots to execute the mission includes for a robot of the one or more robots accessing mission data including the task graph in which the mission is modeled; traversing the task graph including the selected task nodes; and when a selected task node representing the selected task is visited, calling on the task library to execute the selected task and thereby cause the robot to execute the maneuver.

Clause 34. The method of clause 33, wherein the mission further includes an alternate task to be executed when a contingency event occurs during execution of the selected task, the task graph further includes an alternate task node representing the alternate task, and the tasks in the task library further include the alternate task, and wherein the method further comprises for the robot of the one or more robots detecting occurrence of the contingency event during execution of the selected task; transitioning in the task graph from the selected task node to the alternate task node; and calling on the task library to execute the alternate task and thereby cause the robot to execute another maneuver.

Clause 35. The method of clause 33 or clause 34, wherein the mission is associated with one or more alternate tasks to be executed when a contingency event occurs during execution any one of the selected tasks, the task graph is associated with an alternate task graph including one or more alternate task nodes representing the one or more alternate tasks, and the tasks in the task library further include the one or more alternate tasks, and wherein the method further comprises for the robot of the one or more robots detecting occurrence of the contingency event during execution of any one of the selected tasks; transitioning to the alternate task graph; and calling on the task library to execute the one or more alternate tasks and thereby cause the robot to execute one or more other maneuvers.

Clause 36. A computer-readable storage medium for causing one or more robots to execute a mission, the computer-readable storage medium being non-transitory and having computer-readable program code stored therein that, in response to execution by processing circuitry, causes an apparatus to at least identify the mission including a nominal sequence of selected tasks that are executable to cause the one or more robots to execute maneuvers to achieve a mission objective; determine a task graph in which the mission is modeled, the task graph expressed as a directed graph and including selected task nodes representing the selected tasks that are connected by edges representing transitions between the selected tasks; and cause the one or more robots to execute the mission using the task graph and a task library of tasks including a selected task executable to cause the one or more robots to execute a maneuver.

Clause 37. The computer-readable storage medium of clause 36, wherein a selected task in the nominal sequence of the selected tasks causes the one or more robots to execute a nominal maneuver, or an alternate maneuver when a task-specific contingency event occurs during execution of the nominal maneuver, and wherein the apparatus is caused to cause the one or more robots to execute the mission using the task library that includes the selected task executable to cause the one or more robots to execute the nominal maneuver, or the alternate maneuver when the task-specific contingency event occurs.

Clause 38. The computer-readable storage medium of clause 36 or clause 37, wherein the mission further includes one or more alternate tasks to be executed when a contingency event occurs during execution of the selected task in the nominal sequence of selected tasks, and wherein the apparatus is caused to determine the task graph further including one or more alternate task nodes representing the one or more alternate tasks.

Clause 39. The computer-readable storage medium of any of clauses 36 to 38, wherein the mission is associated with one or more alternate tasks to be executed when a contingency event occurs during execution of any one of the selected tasks in the nominal sequence of selected tasks, and wherein the apparatus caused to determine the task graph includes the apparatus caused to determine an alternate task graph including one or more alternate task nodes representing the one or more alternate tasks, each selected task node associated with the alternate task graph.

Clause 40. The computer-readable storage medium of any of clauses 36 to 39, wherein the apparatus caused to cause the one or more robots to execute the mission includes, for a robot of the one or more robots, the apparatus caused to at least access mission data including the task graph in which the mission is modeled; traverse the task graph including the selected task nodes; and when a selected task node representing the selected task is visited, call on the task library to execute the selected task and thereby cause the robot to execute the maneuver.

Clause 41. The computer-readable storage medium of clause 40, wherein the mission further includes an alternate task to be executed when a contingency event occurs during execution of the selected task, the task graph further includes an alternate task node representing the alternate task, and the tasks in the task library further include the alternate task, and wherein for the robot of the one or more robots, the computer-readable storage medium has further computer-readable program code stored therein that, in response to execution by the processing circuitry, causes the apparatus to further at least detect occurrence of the contingency event during execution of the selected task; transition in the task graph from the selected task node to the alternate task node; and call on the task library to execute the alternate task and thereby cause the robot to execute another maneuver.

Clause 42. The computer-readable storage medium of clause 40 or clause 41, wherein the mission is associated with one or more alternate tasks to be executed when a contingency event occurs during execution any one of the selected tasks, the task graph is associated with an alternate task graph including one or more alternate task nodes representing the one or more alternate tasks, and the tasks in the task library further include the one or more alternate tasks, and wherein for the robot of the one or more robots, the computer-readable storage medium has further computer-readable program code stored therein that, in response to execution by the processing circuitry, causes the apparatus to further at least detect occurrence of the contingency event during execution of any one of the selected tasks; transition to the alternate task graph; and call on the task library to execute the one or more alternate tasks and thereby cause the robot to execute one or more other maneuvers.

Clause 43. An apparatus for causing one or more robots to execute a mission in an environment, the apparatus comprising a memory having computer-readable program code stored therein; and processing circuitry configured to access the memory, and for a robot of the one or more robots, execute the computer-readable program code to cause the apparatus to at least: access mission data for the mission including or associated with tasks that are executable to cause the robot to execute maneuvers; execute the tasks according to the mission data to cause the robot to execute the maneuvers; and as the tasks are executed, monitor at least one of the robot or the environment; detect an event based on the monitor, during execution of a task of the tasks; map the event to a level of contingency of a plurality of levels of contingency; transition from the task to another of the tasks according to the level of contingency; and execute the other of the tasks.

Clause 44. The apparatus of clause 43, wherein the event is a local contingency event that is detectable during execution of only certain tasks, and the apparatus caused to detect the event includes the apparatus caused to detect the local contingency event during execution of the task that is one of the certain tasks.

Clause 45. The apparatus of clause 43 or clause 44, wherein the event is a global contingency event that is detectable during execution of any of the tasks, and the apparatus caused to detect the event includes the apparatus caused to detect the global contingency event during execution of the task that is any one of the tasks.

Clause 46. The apparatus of any of clauses 43 to 45, wherein the plurality of levels of contingency are in order of priority, and wherein the apparatus caused to detect the event includes the apparatus caused to detect multiple events including the event, the apparatus caused to map the event includes the apparatus caused to map the multiple events to the respective levels of contingency, and the apparatus caused to transition from the task to the other of the tasks includes the apparatus caused to transition from the task to another of the tasks according to the level of contingency that among the respective levels of contingency is higher in the order of priority.

Clause 47. The apparatus of any of clauses 43 to 46, wherein the processing circuitry is configured to execute the computer-readable program code to cause the apparatus to further, for the robot of the one or more robots: detect another event based on the monitor; map the other event to a non-maneuver action or procedure of the robot; and cause the robot to perform the non-maneuver action or procedure.

Clause 48. The apparatus of any of clauses 43 to 47, wherein the mission data includes a task graph in which the mission is modeled, the task graph expressed as a directed graph and including task nodes representing the tasks that are connected by edges representing transitions between the tasks, and wherein the apparatus caused to execute the tasks includes the apparatus caused to at least traverse the task graph including the task nodes; and when a task node representing the task is visited, call on a task library of the tasks that are executable to cause the robot to execute the maneuvers, the task library called on to execute the task and thereby cause the robot to execute a maneuver.

Clause 49. The apparatus of clause 48, wherein the apparatus caused to transition from the task to the other of the tasks includes the apparatus caused to transition from the task node on an edge that connects the task node to another of the task nodes representing the other of the tasks, the edge associated with the level of contingency.

Clause 50. A method of causing one or more robots to execute a mission in an environment, the method comprising for a robot of the one or more robots accessing mission data for the mission including or associated with tasks that are executable to cause the robot to execute maneuvers; executing the tasks according to the mission data to cause the robot to execute the maneuvers; and as the tasks are executed, monitoring at least one of the robot or the environment; detecting an event based on the monitoring, during execution of a task of the tasks; mapping the event to a level of contingency of a plurality of levels of contingency; transitioning from the task to another of the tasks according to the level of contingency; and executing the other of the tasks.

Clause 51. The method of clause 50, wherein the event is a local contingency event that is detectable during execution of only certain tasks, and detecting the event includes detecting the local contingency event during execution of the task that is one of the certain tasks.

Clause 52. The method of clause 50 or clause 51, wherein the event is a global contingency event that is detectable during execution of any of the tasks, and detecting the event includes detecting the global contingency event during execution of the task that is any one of the tasks.

Clause 53. The method of any of clauses 50 to 52, wherein the plurality of levels of contingency are in order of priority, and wherein detecting the event includes detecting multiple events including the event, mapping the event includes mapping the multiple events to the respective levels of contingency, and transitioning from the task to the other of the tasks includes transitioning from the task to another of the tasks according to the level of contingency that among the respective levels of contingency is higher in the order of priority.

Clause 54. The method of any of clauses 50 to 53, wherein the method further comprises for the robot of the one or more robots: detecting another event based on the monitoring; mapping the other event to a non-maneuver action or procedure of the robot; and causing the robot to perform the non-maneuver action or procedure.

Clause 55. The method of any of clauses 50 to 54, wherein the mission data includes a task graph in which the mission is modeled, the task graph expressed as a directed graph and including task nodes representing the tasks that are connected by edges representing transitions between the tasks, and wherein executing the tasks includes traversing the task graph including the task nodes; and when a task node representing the task is visited, calling on a task library of the tasks that are executable to cause the robot to execute the maneuvers, the task library called on to execute the task and thereby cause the robot to execute a maneuver.

Clause 56. The method of clause 55, wherein transitioning from the task to the other of the tasks includes transitioning from the task node on an edge that connects the task node to another of the task nodes representing the other of the tasks, the edge associated with the level of contingency.

Clause 57. A computer-readable storage medium for causing one or more robots to execute a mission in an environment, the computer-readable storage medium being non-transitory and having computer-readable program code stored therein that, in response to execution by processing circuitry, and for a robot of the one or more robots, causes an apparatus to at least access mission data for the mission including or associated with tasks that are executable to cause the robot to execute maneuvers; execute the tasks according to the mission data to cause the robot to execute the maneuvers; and as the tasks are executed, monitor at least one of the robot or the environment; detect an event based on the monitor, during execution of a task of the tasks; map the event to a level of contingency of a plurality of levels of contingency; transition from the task to another of the tasks according to the level of contingency; and execute the other of the tasks.

Clause 58. The computer-readable storage medium of clause 57, wherein the event is a local contingency event that is detectable during execution of only certain tasks, and the apparatus caused to detect the event includes the apparatus caused to detect the local contingency event during execution of the task that is one of the certain tasks.

Clause 59. The computer-readable storage medium of clause 57 or clause 58, wherein the event is a global contingency event that is detectable during execution of any of the tasks, and the apparatus caused to detect the event includes the apparatus caused to detect the global contingency event during execution of the task that is any one of the tasks.

Clause 60. The computer-readable storage medium of any of clauses 57 to 59, wherein the plurality of levels of contingency are in order of priority, and wherein the apparatus caused to detect the event includes the apparatus caused to detect multiple events including the event, the apparatus caused to map the event includes the apparatus caused to map the multiple events to the respective levels of contingency, and the apparatus caused to transition from the task to the other of the tasks includes the apparatus caused to transition from the task to another of the tasks according to the level of contingency that among the respective levels of contingency is higher in the order of priority.

Clause 61. The computer-readable storage medium of any of clauses 57 to 60, wherein the computer-readable storage medium has further computer-readable program code stored therein that, in response to execution by the processing circuitry, causes the apparatus to further, for the robot of the one or more robots: detect another event based on the monitor; map the other event to a non-maneuver action or procedure of the robot; and cause the robot to perform the non-maneuver action or procedure.

Clause 62. The computer-readable storage medium of any of clauses 57 to 61, wherein the mission data includes a task graph in which the mission is modeled, the task graph expressed as a directed graph and including task nodes representing the tasks that are connected by edges representing transitions between the tasks, and wherein the apparatus caused to execute the tasks includes the apparatus caused to at least traverse the task graph including the task nodes; and when a task node representing the task is visited, call on a task library of the tasks that are executable to cause the robot to execute the maneuvers, the task library called on to execute the task and thereby cause the robot to execute a maneuver.

Clause 63. The computer-readable storage medium of clause 62, wherein the apparatus caused to transition from the task to the other of the tasks includes the apparatus caused to transition from the task node on an edge that connects the task node to another of the task nodes representing the other of the tasks, the edge associated with the level of contingency.

Clause 64. An apparatus for causing one or more robots to execute a mission in an environment, the apparatus comprising a memory having computer-readable program code stored therein; and processing circuitry configured to access the memory, and for a robot of the one or more robots, execute the computer-readable program code to cause the apparatus to at least: cause the robot to execute the mission that includes tasks that are executable to cause the robot to execute maneuvers; determine at least one of a state of the robot, a status of the robot, or a state of the environment; access a task graph in which the mission is modeled, the task graph expressed as a directed graph and including task nodes representing the tasks that are connected by edges representing transitions between the tasks, sequences of edges connecting respective ones of the task nodes defining paths in the task graph; determine a performance of the robot for a path in the task graph using the at least one of the state of the robot, the status of the robot, or the state of the environment, using the task graph, and starting at an unexecuted one of the tasks; determine feasibility of the path from the predicted performance of the robot; and output an indication of the feasibility of the path.

Clause 65. The apparatus of clause 64, wherein the apparatus caused to determine the predicted performance includes the apparatus caused to determine a prediction of at least one of a route traveled by the robot; a time taken by the robot; an end state of the robot; an end status of the robot; or a probability of success.

Clause 66. The apparatus of clause 64 or clause 65, wherein the apparatus is caused to determine the feasibility of the path based on a comparison of the predicted performance and a threshold performance.

Clause 67. The apparatus of any of clauses 64 to 66, wherein the apparatus is caused to determine the predicted performance further using a duplicate task library of duplicate tasks executable to perform a simulation of the tasks.

Clause 68. The apparatus of clause 67, wherein the apparatus caused to determine the predicted performance of the robot includes the apparatus caused to at least traverse the task graph starting at a task node representing the unexecuted one of the tasks; and when the task node representing a task is visited, call on the duplicate task library to execute a duplicate task to perform the simulation of the task, and output the predicted performance of the robot for the task.

Clause 69. The apparatus of clause 68, wherein the apparatus caused to determine the predicted performance further includes the apparatus caused to at least monitor at least one of a model of the robot or a model of the environment; predict a contingency event during the simulation of the task; transition from the task node representing the task to another task node representing another task in response to the contingency event; and call on the duplicate task library to execute another duplicate task to perform the simulation of the other task, and output the predicted performance of the robot for the other task.

Clause 70. The apparatus of clause 68 or clause 69, wherein the apparatus is caused to traverse the task graph on a nominal one of the paths, wherein the apparatus caused to determine feasibility of the path includes the apparatus caused to determine feasibility of the nominal one of the paths, and wherein the processing circuitry is configured to execute the computer-readable program code to cause the apparatus to further determine an alternate one of the paths in response to the nominal one of the paths being determined infeasible, the indication of the feasibility of the path including the alternate one of the paths as a proposed feasible path.

Clause 71. The apparatus of any of clauses 64 to 70, wherein the apparatus is caused to determine the predicted performance further using task predictors that are executable to perform a prediction of performance and thereby determine the predicted performance of the robot for respective ones of the tasks.

Clause 72. The apparatus of clause 71, wherein the apparatus caused to determine the predicted performance of the robot includes the apparatus caused to at least traverse the task graph starting at a task node representing the unexecuted one of the tasks; and when the task node is visited, execute a respective one of the task predictors to perform the prediction of performance and thereby determine the predicted performance of the robot for the unexecuted one of the tasks.

Clause 73. The apparatus of clause 72, wherein the apparatus is caused to traverse the task graph on a nominal one of the paths, wherein the apparatus caused to determine feasibility of the path includes the apparatus caused to determine feasibility of the nominal one of the paths, and wherein the processing circuitry is configured to execute the computer-readable program code to cause the apparatus to further determine an alternate one of the paths in response to the nominal one of the paths being determined infeasible, the indication of the feasibility of the path including the alternate one of the paths as a proposed feasible path.

Clause 74. A method of causing one or more robots to execute a mission in an environment, the method comprising for a robot of the one or more robots causing the robot to execute the mission that includes tasks that are executable to cause the robot to execute maneuvers; determining at least one of a state of the robot, a status of the robot, or a state of the environment; accessing a task graph in which the mission is modeled, the task graph expressed as a directed graph and including task nodes representing the tasks that are connected by edges representing transitions between the tasks, sequences of edges connecting respective ones of the task nodes defining paths in the task graph; determining a predicted performance of the robot for a path in the task graph using the at least one of the state of the robot, the status of the robot, or the state of the environment, using the task graph, and starting at an unexecuted one of the tasks; determining feasibility of the path from the predicted performance of the robot; and outputting an indication of the feasibility of the path.

Clause 75. The method of clause 74, wherein determining the predicted performance includes determining a prediction of at least one of a route traveled by the robot; a time taken by the robot; an end state of the robot; an end status of the robot; or a probability of success.

Clause 76. The method of clause 74 or clause 75, wherein determining the feasibility of the path includes determining the feasibility of the path based on a comparison of the predicted performance and a threshold performance.

Clause 77. The method of any of clauses 74 to 76, wherein determining the predicted performance of the robot includes determining the predicted performance further using a duplicate task library of duplicate tasks executable to perform a simulation of the tasks.

Clause 78. The method of clause 77, wherein determining the predicted performance of the robot comprises traversing the task graph starting at a task node representing the unexecuted one of the tasks; and when the task node representing a task is visited, calling on the duplicate task library to execute a duplicate task to perform the simulation of the task, and output the predicted performance of the robot for the task.

Clause 79. The method of clause 78, wherein determining the predicted performance further comprises monitoring at least one of a model of the robot or a model of the environment; predicting a contingency event during the simulation of the task; transitioning from the task node representing the task to another task node representing another task in response to the contingency event; and calling on the duplicate task library to execute another duplicate task to perform the simulation of the other task, and output the predicted performance of the robot for the other task.

Clause 80. The method of clause 78 or clause 79, wherein traversing the task graph includes traversing the task graph on a nominal one of the paths, wherein determining feasibility of the path includes determining feasibility of the nominal one of the paths, and wherein the method further comprises determining an alternate one of the paths in response to the nominal one of the paths being determined infeasible, the indication of the feasibility of the path including the alternate one of the paths as a proposed feasible path.

Clause 81. The method of any of clauses 74 to 80, wherein determining the predicted performance of the robot includes determining the predicted performance further using task predictors that are executable to perform a prediction of performance and thereby determine the predicted performance of the robot for respective ones of the tasks.

Clause 82. The method of clause 81, wherein determining the predicted performance of the robot includes traversing the task graph starting at a task node representing the unexecuted one of the tasks; and when the task node is visited, executing a respective one of the task predictors to perform the prediction of performance and thereby determine the predicted performance of the robot for the unexecuted one of the tasks.

Clause 83. The method of clause 82, wherein traversing the task graph includes traversing the task graph on a nominal one of the paths, wherein determining feasibility of the path includes determining feasibility of the nominal one of the paths, and wherein the method further comprises determining an alternate one of the paths in response to the nominal one of the paths being determined infeasible, the indication of the feasibility of the path including the alternate one of the paths as a proposed feasible path.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for causing one or more robots to execute a mission, the apparatus comprising:
   a memory having computer-readable program code stored therein; and
   processing circuitry configured to access the memory, and execute the computer-readable program code to cause the apparatus to at least:
   identify the mission including a nominal sequence of selected tasks that are executable to cause the one or more robots to execute maneuvers to achieve a mission objective;
   determine a task graph in which the mission is modeled, wherein the task graph is expressed as a directed graph charting selected task nodes representing the selected tasks that are connected by edges representing transitions between the selected tasks;
   wherein one or more of the edges representing transitions between the selected tasks is associated with a level of contingency;
   transition from one of the selected tasks to another one of the selected tasks according to the level of contingency;
   cause the one or more robots to execute the mission using the task graph and a task library of tasks including the selected tasks executable to cause the one or more robots to execute a maneuver;
   wherein the mission further includes one or more alternate tasks to be executed when a contingency event occurs during execution of at least one of the selected tasks in the nominal sequence of selected tasks; and
   wherein the apparatus is caused to determine the task graph further includes one or more alternate task nodes representing the one or more alternate tasks.

2. The apparatus of claim 1, wherein the selected tasks in the nominal sequence of the selected tasks causes the one or more robots to execute a nominal maneuver, or an alternate maneuver when a task-specific contingency event occurs during execution of the nominal maneuver, and
   wherein the apparatus is caused to cause the one or more robots to execute the mission using the task library that includes the selected tasks executable to cause the one or more robots to execute the nominal maneuver, or the alternate maneuver when the task-specific contingency event occurs.

3. The apparatus of claim 1, wherein
   the apparatus caused to determine the task graph includes the apparatus caused to determine an alternate task graph including one or more alternate task nodes representing the one or more alternate tasks.

4. The apparatus of claim 1, wherein the apparatus caused to cause the one or more robots to execute the mission includes, for a robot of the one or more robots, the apparatus caused to at least:
   access mission data including the task graph in which the mission is modeled;
   traverse the task graph including the selected task nodes; and
   when a selected task node of the selected task nodes representing one of the selected tasks is visited, call on the task library to execute the one of the selected tasks and thereby cause the robot to execute the maneuver.

5. The apparatus of claim 4, wherein the tasks in the task library further include the one or more alternate tasks, and
   wherein for the robot of the one or more robots, the processing circuitry is configured to execute the computer-readable program code to cause the apparatus to further at least:
   detect occurrence of the contingency event during execution of one of the selected tasks;
   transition in the task graph from the selected one of task nodes to one of the alternate task nodes; and
   call on the task library to execute the one or more alternate tasks and thereby cause the robot to execute another maneuver.

6. The apparatus of claim 4, wherein the task graph is associated with an alternate task graph including one or more of the alternate task nodes representing the one or more alternate tasks, and the tasks in the task library further include the one or more alternate tasks, and
   wherein for the robot of the one or more robots, the processing circuitry is configured to execute the computer-readable program code to cause the apparatus to further at least:
   detect occurrence of the contingency event during execution of any one of the selected tasks;
   transition to the alternate task graph; and
   call on the task library to execute the one or more alternate tasks and thereby cause the robot to execute one or more other maneuvers.

7. A method of causing one or more robots to execute a mission, the method comprising:

identifying the mission including a nominal sequence of selected tasks that are executable to cause the one or more robots to execute maneuvers to achieve a mission objective;

determining a task graph in which the mission is modeled, wherein the task graph is expressed as a directed graph charting selected task nodes representing the selected tasks that are connected by edges representing transitions between the selected tasks;

wherein one or more of the edges representing transitions between the selected tasks is associated with a level of contingency;

transitioning from one of the selected tasks to another one of the selected tasks according to the level of contingency; and causing the one or more robots to execute the mission using the task graph and a task library of tasks including a selected task executable to cause the one or more robots to execute a maneuver.

8. The method of claim 7, wherein the selected task in the nominal sequence of the selected tasks causes the one or more robots to execute a nominal maneuver, or an alternate maneuver when a task-specific contingency event occurs during execution of the nominal maneuver, and wherein causing the one or more robots to execute the mission includes causing the one or more robots to execute the mission using the task library that includes the selected task executable to cause the one or more robots to execute the nominal maneuver, or the alternate maneuver when the task-specific contingency event occurs.

9. The method of claim 7, wherein the mission further includes one or more alternate tasks to be executed when a contingency event occurs during execution of the selected task in the nominal sequence of selected tasks, and wherein determining the task graph includes determining the task graph further including one or more alternate task nodes representing the one or more alternate tasks.

10. The method of claim 7, wherein the mission is associated with one or more alternate tasks to be executed when a contingency event occurs during execution of any one of the selected tasks in the nominal sequence of selected tasks, and wherein determining the task graph includes determining an alternate task graph including one or more alternate task nodes representing the one or more alternate tasks, each selected task node associated with the alternate task graph.

11. The method of claim 7, wherein causing the one or more robots to execute the mission includes for a robot of the one or more robots:

accessing mission data including the task graph in which the mission is modeled;

traversing the task graph including the selected task nodes; and when a selected task node of the selected task nodes representing one of the selected tasks is visited, calling on the task library to execute the one of the selected tasks and thereby cause the robot to execute the maneuver.

12. The method of claim 11, wherein the mission further includes an alternate task to be executed when a contingency event occurs during execution of the selected task, the task graph further includes an alternate task node representing the alternate task, and the tasks in the task library further include the alternate task, and wherein the method further comprises for the robot of the one or more robots:

detecting occurrence of the contingency event during execution of the selected task;

transitioning in the task graph from the selected task node to the alternate task node; and calling on the task library to execute the alternate task and thereby cause the robot to execute another maneuver.

13. The method of claim 11, wherein the mission is associated with one or more alternate tasks to be executed when a contingency event occurs during execution any one of the selected tasks, the task graph is associated with an alternate task graph including one or more alternate task nodes representing the one or more alternate tasks, and the tasks in the task library further include the one or more alternate tasks, and wherein the method further comprises for the robot of the one or more robots:

detecting occurrence of the contingency event during execution of any one of the selected tasks;

transitioning to the alternate task graph; and calling on the task library to execute the one or more alternate tasks and thereby cause the robot to execute one or more other maneuvers.

14. A computer-readable storage medium for causing one or more robots to execute a mission, the computer-readable storage medium being non-transitory and having computer-readable program code stored therein that, in response to execution by processing circuitry, causes an apparatus to at least:

identify the mission including a nominal sequence of selected tasks that are executable to cause the one or more robots to execute maneuvers to achieve a mission objective;

determine a task graph in which the mission is modeled, wherein the task graph is expressed as a directed graph charting selected task nodes representing the selected tasks that are connected by edges representing transitions between the selected tasks;

wherein one or more of the edges representing transitions between the selected tasks is associated with a level of contingency;

transition from one of the selected tasks to another one of the selected tasks according to the level of contingency; and cause the one or more robots to execute the mission using the task graph and a task library of tasks including a selected task executable to cause the one or more robots to execute a maneuver.

15. The computer-readable storage medium of claim 14, wherein the selected task in the nominal sequence of the selected tasks causes the one or more robots to execute a nominal maneuver, or an alternate maneuver when a task-specific contingency event occurs during execution of the nominal maneuver, and wherein the apparatus is caused to cause the one or more robots to execute the mission using the task library that includes the selected task executable to cause the one or more robots to execute the nominal maneuver, or the alternate maneuver when the task-specific contingency event occurs.

16. The computer-readable storage medium of claim 14, wherein the mission further includes one or more alternate tasks to be executed when a contingency event occurs during execution of the selected task in the nominal sequence of selected tasks, and wherein the apparatus is caused to determine the task graph further including one or more alternate task nodes representing the one or more alternate tasks.

17. The computer-readable storage medium of claim 14, wherein the mission is associated with one or more alternate tasks to be executed when a contingency event occurs during execution of any one of the selected tasks in the nominal sequence of selected tasks, and wherein the apparatus caused to determine the task graph includes the apparatus caused to determine an alternate task graph including one or more alternate task nodes representing the one or more alternate tasks, each of the selected task nodes associated with the alternate task graph.

18. The computer-readable storage medium of claim 14, wherein the apparatus caused to cause the one or more robots to execute the mission includes, for a robot of the one or more robots, the apparatus caused to at least:

access mission data including the task graph in which the mission is modeled;

traverse the task graph including the selected task nodes; and when a selected task node of the selected task nodes representing one of the selected tasks is visited, call on the task library to execute the one of the selected tasks and thereby cause the robot to execute the maneuver.

19. The computer-readable storage medium of claim 18, wherein the mission further includes an alternate task to be executed when a contingency event occurs during execution of the selected task, the task graph further includes an alternate task node representing the alternate task, and the tasks in the task library further include the alternate task, and wherein for the robot of the one or more robots, the computer-readable storage medium has further computer-readable program code stored therein that, in response to execution by the processing circuitry, causes the apparatus to further at least:

detect occurrence of the contingency event during execution of the selected task;

transition in the task graph from the selected task node to the alternate task node; and call on the task library to execute the alternate task and thereby cause the robot to execute another maneuver.

20. The computer-readable storage medium of claim 18, wherein the mission is associated with one or more alternate tasks to be executed when a contingency event occurs during execution any one of the selected tasks, the task graph is associated with an alternate task graph including one or more alternate task nodes representing the one or more alternate tasks, and the tasks in the task library further include the one or more alternate tasks, and wherein for the robot of the one or more robots, the computer-readable storage medium has further computer-readable program code stored therein that, in response to execution by the processing circuitry, causes the apparatus to further at least:

detect occurrence of the contingency event during execution of any one of the selected tasks;

transition to the alternate task graph; and call on the task library to execute the one or more alternate tasks and thereby cause the robot to execute one or more other maneuvers.

21. The apparatus of claim 1, wherein the task graph includes an additional edge that connects one of the task nodes to a ground node, and a level of contingency is associated with the additional edge.

* * * * *